United States Patent
Garcia

(10) Patent No.: US 9,631,608 B2
(45) Date of Patent: Apr. 25, 2017

(54) WIND-POWER-PLANT CONTROL UPON LOW-VOLTAGE GRID FAULTS

(71) Applicant: VESTAS WIND SYSTEMS A/S, Aarhus N (DK)

(72) Inventor: Jorge Martinez Garcia, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 112 days.

(21) Appl. No.: 14/403,925

(22) PCT Filed: Jun. 11, 2013

(86) PCT No.: PCT/DK2013/050186
§ 371 (c)(1),
(2) Date: Nov. 25, 2014

(87) PCT Pub. No.: WO2013/185772
PCT Pub. Date: Dec. 19, 2013

(65) Prior Publication Data
US 2015/0137520 A1    May 21, 2015

Related U.S. Application Data

(60) Provisional application No. 61/672,682, filed on Jul. 17, 2012.

(30) Foreign Application Priority Data

Jun. 12, 2012  (DK) .................................. 2012 70322

(51) Int. Cl.
*F03D 9/00* (2016.01)
*H02P 9/04* (2006.01)
(Continued)

(52) U.S. Cl.
CPC ............. *F03D 9/003* (2013.01); *F03D 7/00* (2013.01); *H02J 3/1885* (2013.01); *H02J 3/386* (2013.01);
(Continued)

(58) Field of Classification Search
None
See application file for complete search history.

(56) References Cited

U.S. PATENT DOCUMENTS

| 7,504,738 B2* | 3/2009 | Barton | F03D 7/0284 |
| | | | 290/40 R |
| 7,514,907 B2* | 4/2009 | Rajda | F03D 9/005 |
| | | | 323/205 |

(Continued)

FOREIGN PATENT DOCUMENTS

| CA | 2760888 A1 | 6/2012 |
| EP | 2267306 A2 | 12/2010 |

(Continued)

OTHER PUBLICATIONS

Voltage Control in Wind Power Plants with Doubly Fed Generators; by Jorge Martinez Garcia; Thesis Submitted to the Institute of Energy Technology of Aalborg University for the Degree of Doctor of Philosophy, Sep. 2010; Copyright © Jorge Martinez Garcia, 2010; 232 pages.*

(Continued)

*Primary Examiner* — Ronald Hartman, Jr.
(74) *Attorney, Agent, or Firm* — Patterson + Sheridan, LLP

(57) ABSTRACT

A wind power plant connected to an electric grid. A central plant controller is configured to carry out a method of controlling an electric output of the wind power plant in the event of a transient low-voltage fault of the electric grid. The central plant controller is configured, after a fault stage in response to detection of a low-voltage fault during which the wind turbines ride through the grid fault, to control the wind power plant during a post-fault-support stage to provide only real power, or perform voltage control. The central plant controller is configured to resume control of the wind power (Continued)

plant according to the nominal-grid operation mode, which prevailed before the low-voltage fault, in a nominal-grid operation stage.

20 Claims, 8 Drawing Sheets

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 3/18 | (2006.01) |
| H02J 3/38 | (2006.01) |
| F03D 7/00 | (2006.01) |
| H02P 9/10 | (2006.01) |

(52) U.S. Cl.
CPC ............ *H02P 9/102* (2013.01); *Y02E 10/763* (2013.01); *Y02E 40/32* (2013.01)

(56) References Cited

U.S. PATENT DOCUMENTS

| | | | | |
|---|---|---|---|---|
| 8,046,109 B2* | 10/2011 | Larsen | .................. | F03D 7/0284 290/44 |
| 2008/0093853 A1* | 4/2008 | Barker | .................... | H02P 9/007 290/44 |
| 2009/0250931 A1* | 10/2009 | Schubert | ................. | H02P 9/007 290/44 |
| 2011/0140428 A1 | 6/2011 | Wakata et al. | | |
| 2011/0178646 A1 | 7/2011 | Haj-Maharsi et al. | | |
| 2011/0204630 A1* | 8/2011 | Arinaga | ................. | F03D 7/0272 290/44 |
| 2012/0010759 A1* | 1/2012 | Larsen | .................. | F03D 7/0284 700/292 |
| 2012/0049516 A1* | 3/2012 | Viassolo | ................. | F03D 9/003 290/44 |
| 2012/0262129 A1* | 10/2012 | Lu | ............................. | H02P 9/10 322/28 |
| 2014/0062086 A1* | 3/2014 | Mata Dumenjo | ..... | H02J 3/1842 290/44 |

FOREIGN PATENT DOCUMENTS

| | | |
|---|---|---|
| WO | 2010/002402 A1 | 1/2010 |
| WO | 2011/050807 A2 | 5/2011 |

OTHER PUBLICATIONS

Danish Search Report for PA 2012 70322, Jan. 15, 2013.
International Search Report for PCT/DK2013/050186, Dec. 6, 2013.

* cited by examiner

WIND-POWER-PLANT CONTROL UPON LOW-VOLTAGE GRID FAULTS

FIELD OF THE INVENTION

The present invention relates to wind-power-plant control in the event of low-voltage grid faults and, for example, to wind power plants able to ride through transient low-voltage faults and methods of controlling such wind power plants

BACKGROUND OF THE INVENTION

E.ON Netz, "Grid Code High and extra high voltage", E.ON Netz GmbH Bayreuth, 1 Apr. 2006, p. 15-20 requires generating plants, such as wind farms, to support the grid voltage with additional reactive current during a voltage dip. To do this, voltage control is activated in the event of a voltage dip of more than 10% of the effective value of the generator voltage. The voltage control must take place within 20 ms after fault recognition by providing a reactive current on the low-voltage side of the generator transformer amounting to at least 2% of the rated current for each percent of the voltage dip. A reactive power output of at least 100% of the rated current must be possible if, necessary. After the voltage returns to the dead band, the voltage support must be maintained for a further 500 ms in accordance with the specified characteristic.

US 2010/0176770 A1 describes a method and an electricity-generating installation, e.g. a wind energy installation, for stabilizing an electricity-distribution network. After detection of a network fault, a stabilization regulator in the installation is activated. The stabilization regulator regulates the voltage of the electrical power as a function of a feed-back voltage signal and has a step-function response that rises over time. After a predetermined time period has elapsed since the activation of the stabilization regulator, the reactive current feed is increased beyond a limit which is provided for normal operation if the network has not stabilized.

US 2009/0250931 A1 describes a method for operating a wind energy plant with a fault-ride-through functionality. In the event of a fault the converters are controlled by a control module which controls the torque, active power, reactive current and reactive power by means of command variables so as to support the grid in the event of a fault. For example, the current function for the reactive current will be determined dependent on the absolute difference between the nominal grid voltage and the grid voltage during the fault. In this way it is made sure that the wind energy plant will deliver the necessary contribution to support the grid in the event of a fault.

SUMMARY OF THE INVENTION

According to a first aspect, a wind power plant is connected to an electric grid. The electric grid has a nominal voltage. The wind power plant comprises a central plant controller and wind turbine generators (abbreviated WTGs, also referred to as "wind turbines"). The central plant controller is configured to carry out a method of controlling an electric output of the wind power plant in the event of a transient low-voltage fault of the electric grid. The wind turbines are configured to operate, in the absence of a low-voltage fault, in a nominal-grid operation mode according to at least one reference value of an electric-production parameter provided by the central plant controller. According to one alternative, the central plant controller is configured, after a fault stage in response to detection of a low-voltage fault during which the wind turbines ride through the grid fault, to control the wind power plant during a post-fault-support stage to provide only real power. According to another alternative, the central plant controller is configured, after a fault stage in response to detection of a low-voltage fault during which the wind turbines ride through the grid fault, to control the wind power plant during a post-fault-support stage, to perform voltage control. The central plant controller is configured to resume, after the post-fault stage, control of the wind power plant according to the nominal-grid operation mode, which prevailed before the low-voltage fault, in a nominal-grid operation stage.

According to another aspect, a method is provided of controlling an electric output of a wind power plant connected to an electric grid with a nominal voltage, in the event of a transient low-voltage fault of the electric grid. The wind power plant comprises wind turbines and a central plant controller. The wind turbines operate, in the absence of a low-voltage fault, in a nominal-grid operation mode according to at least one reference value of an electric-production parameter provided by the central plant controller. The method comprises three stages of operation during and after a low-voltage fault: a fault stage in response to detection of a low-voltage fault, during which the wind turbines are controlled to ride through the grid fault; a post-fault-support stage during which the wind power plant is controlled by the central plant controller to: (i) provide only real power, or (ii) perform voltage control; a nominal-grid operation stage in which the nominal-grid operation mode, which prevailed before the low-voltage fault, is resumed.

According to another aspect, a wind power plant is connected to an electric grid. The wind power plant comprises wind turbines, a central plant controller, and local wind-turbine controllers. The central plant controller and the local wind-turbine controllers are configured to carry out a method of controlling an electric output of the wind power plant in the event of a transient low-voltage fault of the electric grid. The central plant controller is configured to cause operation of the wind turbines, in the absence of a low-voltage fault, in a nominal-grid operation mode according to at least one reference value of an electric-production parameter provided by the central plant controller. The local wind-turbine controllers are configured, in response to a low-voltage fault, to control the wind turbines autonomously with regard to their electric output to ride through the grid fault. The central plant controller is configured to freeze at least that part of the central plant controller which provides control of electric production in the nominal-operation mode, and store a pre-fault-operation value of at least one control variable, during autonomous wind-turbine control. The central plant controller is configured, upon resumption of the nominal-grid operation mode, to resume central plant control using the at-least-one stored control-variable value from pre-fault operation.

According to another aspect, a method is provided of controlling a wind power plant to ride through a transient low-voltage fault of an electric grid to which the wind power plant is connected, the wind power plant comprising wind turbines, a central plant controller and local wind-turbine controllers. The wind turbines operate, in the absence of a low-voltage fault, in a nominal-grid operation mode according to at least one reference value of an electric-production parameter provided by the central plant controller. In response to detection of a low-voltage fault, the local wind-turbine controllers operate the wind turbines autonomously with regard to their electric output to ride through the grid fault, and at least that part of the central plant controller which provides control of electric production in the nominal-operation mode is frozen and a pre-fault-operation value of at least one control variable is stored. Upon resumption of the nominal-grid operation mode, central plant control is resumed using the at-least-one stored control-variable value from pre-fault operation.

Other features are inherent in the products and methods disclosed or will become apparent to those skilled in the art from the following description and the accompanying drawings.

BRIEF DESCRIPTION OF THE DRAWINGS

Embodiments of the present invention are now further explained by way of example with reference to the accompanying drawings, in which.

Figure 1:
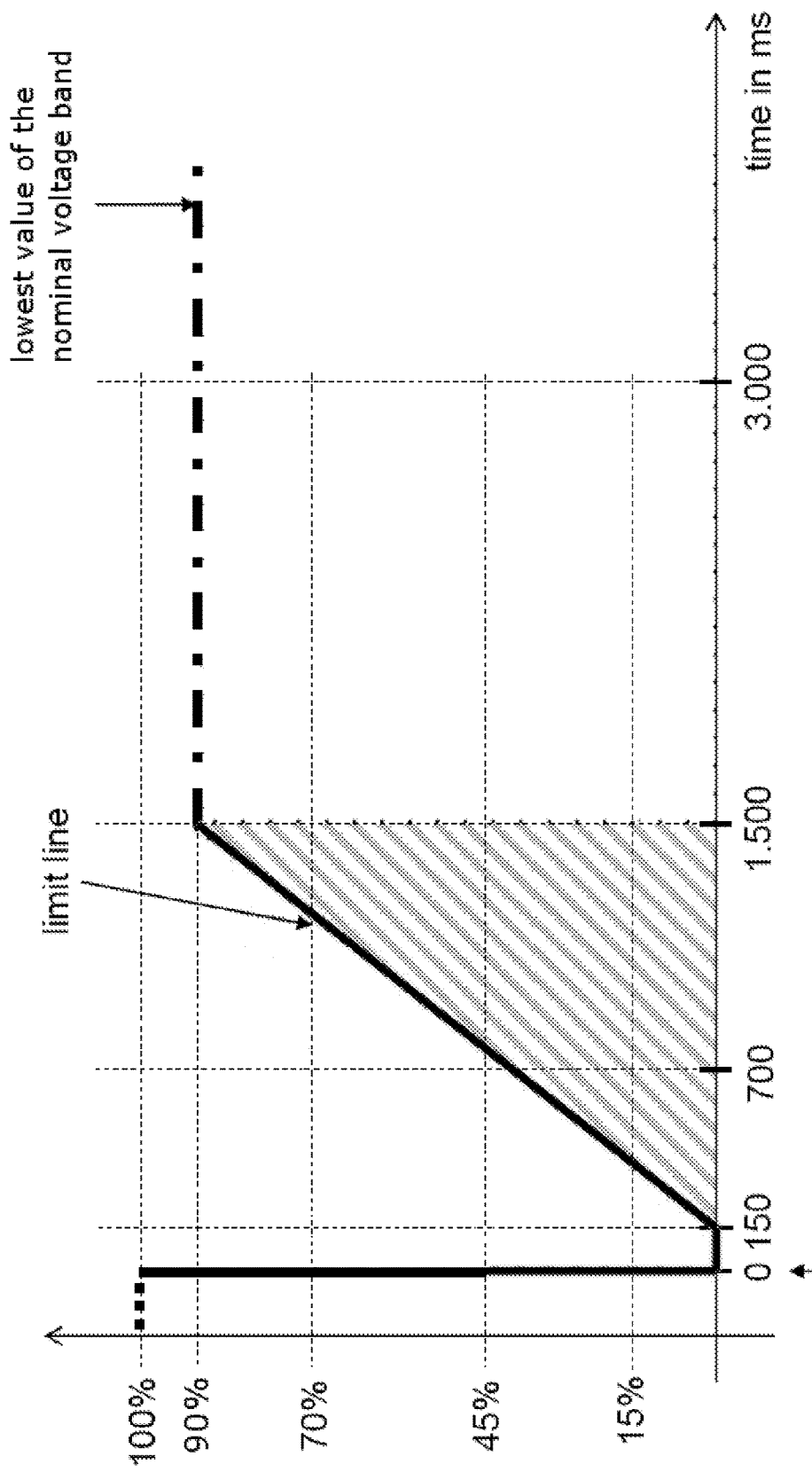
FIG. 1 is an exemplary limit curve for the grid voltage as a function of time which defines a low-voltage ride-through requirement.

The drawings and the description of the drawings are of embodiments of the invention and not of the invention itself.

GENERAL DESCRIPTION OF DIFFERENT ASPECTS OF EMBODIMENTS

Before turning to the detailed description of embodiments on the basis of the drawings, different aspects of embodiments will be described at a more general level. This description is of embodiments of the invention and not of the invention itself.

Electric transmission and/or distribution networks, herein referred to as "electric grids", normally operate in a voltage range within a lower and an upper threshold around a nominal voltage value. The lower threshold is, for example, in a range from about −5% to about −20% and the upper threshold is, for example in a range from about +5% to about +20% of the nominal voltage. For example, in a 110 kV network the operating range is 96-123 kV, in a 220 kV network it is 193-245 kV, and in a 380 kV network it is 350-420 kV.

Short-circuits, e.g. caused by lightning, may cause the grid voltage to drop significantly below that operating range, depending on the distance of the short-circuit to the wind power plant at issue. A very close short-circuit can cause the voltage to drop close to zero. In the embodiments, a low-voltage grid fault (or low-voltage network fault) is a drop of the grid voltage below the nominal grid-operating range. In some embodiments the voltage drop must in addition continue for a certain minimum time interval, e.g. for at least 10-100 ms to be qualified as a low-voltage grid fault. Typically, such low-voltage grid faults are cleared by the network within about 100 ms to 1000 ms by disconnecting the branch in which the short-circuit occurred and/or by extinguishing an arc caused by lightning.

Owing to the significant proportion of electricity produced using wind power, in many countries wind power plants are now required to ride through such low-voltage grid faults rather than shut-down, so as to be able to resume electricity production when, or shortly after, the grid voltage has returned to the nominal grid-operating range. 'Low-voltage ride through' (or briefly 'ride through') means that the wind turbines of the wind-power plant stay operational and do not disconnect from the grid during and after the low-voltage grid fault. In some countries, such as Germany or Spain, wind turbine generators are even required to support the recovery of the grid by injecting additional reactive current (capacitive current) during the low-voltage grid fault. Such requirements are usually set out in so-called 'grid codes'.

During normal operation, before a fault happens, the individual wind turbines of a wind power plant are normally controlled by a plant controller. For example, the plant controller provides reference values (i.e. target values or "set points") of one or more electric-production parameters, such as the active power, the reactive power, and/or the voltage to be produced by the individual wind turbines of the wind power plant.

In some embodiments, in the event of a low-voltage grid fault the central control by the plant controller is replaced by autonomous control carried out by the wind turbines themselves during a "fault stage", in order to ride through the low-voltage fault. This is also referred to as "local control". A reason for changing from central to local control may, for example, be that data communication between the central plant controller and the individual wind-turbine controllers is too slow for the central control system to cope with the response-time demanded, which is typically in the order of about 5 to 20 ms.

In other embodiments, e.g. embodiments in which the communication network in the wind power plant is fast enough to cope with the response time demanded, the central plant controller continues to control the wind turbines during the fault stage to ride through the grid fault, by calculating and providing setpoints to the wind turbines, for example based on measurements of the grid voltage at the point of the plant's common coupling to the grid, or another point of common measurement. In these embodiments the wind turbines do not enter local control during the fault stage.

During the fault stage, in some grids wind turbine generators may take any action required for the wind turbines to ride through the voltage dip; e.g. the wind turbine generators may thermally dissipate active power produced. However, some grid codes (e.g. the E.ON grid 2006 code mentioned at the outset) require wind turbine generators to support the recovery of the grid by injecting additional reactive current into the grid during the fault stage.

Conventionally, when the fault has been cleared and after a short transition period of, e.g. 500 ms the fault-ride-through operation, including any fault-stage-triggered injection of reactive current is terminated and normal operation with the pre-fault reference values is resumed under the central control of the plant controller. A fault is considered to be cleared, for example, when the grid voltage has returned to the lower limit of the nominal grid-operating range, or to a somewhat lower voltage-return threshold to ensure a hysteresis effect. Since some types of generators cannot raise their active-power output immediately to their nominal power, generators are allowed to increase their active-power output continuously with a given minimum rate of increase.

The inventor of the present invention has recognized that this returning to the pre-fault reference values immediately after a low-voltage grid fault has been cleared, is not always optimal. The inventor has recognized that, as a consequence of the grid fault, the impedance of the grid "seen" by a wind power plant may have changed, or the grid stability can lowered. For example, the impedance of the grid may have changed due to the disconnection of a branch of the grid in which a short-circuit has occurred. Grid stability may be lower because of malfunction of other nearby generators due to the fault.

Thus, the inventor has recognized that simply returning to pre-fault operation with the pre-fault reference values may be contraindicated for grid recovery. For example, assume that a pre-fault reference value (e.g. calculated according to an external reference and certain settings in the central plant controller) required a wind power plant to produce a certain fraction of capacitive reactive power. If an impedance change happened as a consequence of a grid fault which required injection of inductive reactive power returning to the pre-fault operation might impede the further recovery of the grid and cause instability. Since it is not known in advance whether, and in which direction (inductive or capacitive), the grid impedance has changed as a consequence of a fault, this invention teaches a post-fault support stage to be inserted between the fault stage and the nominal-grid operation stage during which control is performed by the central plant controller which controls the wind power plant to operate in a recovery-supporting manner.

"Recovery-supporting" (or briefly "supporting") means that the wind power plant is controlled to (i) to provide only real power (power factor=1), or (ii) perform voltage control with a voltage reference supporting grid recovery. Since the impedance change after a low-voltage grid fault is normally only temporary (typically ranging from a few seconds to a few hours) the post-fault support stage is only a temporary stage, and after the pre-fault conditions have been re-established, the nominal grid operation stage is resumed and the nominal-grid operation mode with the pre-fault reference values is resumed. The provision of a post-fault support stage with supporting operation helps the grid to recover and become stable after a grid fault, even if the grid impedance has temporarily changed.

While US 2010/0176770 A1, mentioned at the outset, teaches that the fault stage in which the wind turbines operate autonomously is subdivided into different conditional phases with increasingly severe intervention with regard to reactive-current production, the present invention provides an additional centrally controlled post-fault-support stage in which the wind power plant operates in a supporting mode.

Accordingly, the embodiments provide wind power plant connected to an electric grid and implementing a method of controlling an electric output of a wind power plant upon a transient low-voltage fault of the electric grid. The nominal grid voltage may, for example, be in the range from 100-400 kV.

As indicated above, a low-voltage grid fault is a drop of the grid voltage below the lower voltage threshold of the nominal grid-operating range. The lower voltage threshold is, for example, in a range from about −5% to about −20% below the nominal voltage of the grid. For example, in a grid with a nominal voltage of 110 kV the lower voltage threshold may be 96 kV, in a grid with a nominal voltage of 220 kV it may be 193 kV, and in a grid with a nominal voltage of 380 kV it may be 350 kV. In some embodiments the voltage must persist for a certain minimum time interval, e.g. for at least 10-100 ms, below the lower voltage threshold to be qualified as a low-voltage grid fault.

In the embodiments, the wind turbines are only required to ride through transient low-voltage grid faults, i.e. grid faults in which the voltage drop below the lower voltage threshold lasts less than a second or a few seconds, e.g. less 0.7 to 5 s. For example, according to the E.ON 2006 grid code, FIGS. 5 and 6, this maximum-required ride-through duration is 1.5 s. Wind turbines of the embodiments are not required to ride through low-voltage grid faults lasting longer than, e.g., 5 s, i.e. grid faults that are not transient.

In the embodiments, the wind power plant includes a plurality of wind turbines equipped with local wind-turbine controllers, and a central plant controller. In some embodiments, the wind power plant has an internal electric grid to which the wind turbines are connected and into which they feed the electric power they produce. The internal grid may be a single line to which all the wind turbines are connected in a sequence, or may have a tree or ring structure. In some embodiments, it is connected to the external transmission and/or distribution grid via a point of common coupling, also referred to as "PCC" (below, the word "grid" generally refers to the external grid (downstream of the PCC); when reference is made to the local grid inside the wind power plant (upstream of the PCC) the term "internal grid" is used; "downstream" and "upstream" refer to the direction of the flow of energy from the wind turbines to the external grid). In some embodiments, the central plant controller measures electric parameters relating to the wind power plant as a whole, for example at least one of a grid voltage "seen" by the wind power plant, the electric current flowing out of the wind power plant, the relative phase of the grid voltage and the current, the frequency of the grid voltage. These measurements can be made at the PCC or at a point somewhere upstream or downstream of the PCC where all the internal-grid lines are combined. The point where the measurements are made is also referred to as the "point of common measurement", or "PCM".

In some of the embodiments, the central plant controller's main task is to ensure that the wind power plant—seen as a whole—supplies electric power according to requirements of the grid provider during steady-state operation, i.e. in the absence of a transient low-voltage grid fault, or other faults.

Regarding reactive power production, the grid provider may, for example require that an absolute level of reactive power (e.g. Q in MVAR), or a relative level of reactive power or current (relative to the active power or current), e.g. expressed by a power factor (cos φ) including an indication whether the reactive power shall be capacitive or inductive, or a phase angle (φ), be supplied by the wind power plant to the grid.

Reactive power production can also indirectly be prescribed by the grid provider by a desired voltage level (e.g. U in kV), for example the desired level of the voltage at the PCM, which may be the PCC. The desired voltage level is, in some embodiments, achieved by voltage control by the plant controller. Voltage control is based on the fact that the voltage across the impedance of the part of the grid connecting the wind power plant (often a branch line) can be strongly influenced (i.e. raised or lowered) by injecting (inductive or capacitive) reactive power. In some of these embodiments with voltage control the plant controller performs closed-loop control of the voltage by repeatedly measuring the voltage at the PCM (which, for example, may be the PCC), comparing it with the voltage level desired by the grid provider to obtain a signal representing the voltage error, and causing reactive-power to be produced with a sign (inductive or capacitive) and level suitable to counteract the voltage error. The desired voltage is not necessarily the nominal grid voltage because it is often desired that additional reactive power should be provided beyond that which would be required to keep the grid voltage at the nominal voltage.

Regarding active power production, normally wind power plants aim at producing as much power as possible. In some embodiments, however, the central plant controller is configured to perform curtailment and/or grid frequency support and/or and damping grid oscillations control during the post-fault-support stage. After a fault, generators or grid areas can oscillate due to the mechanical shaft oscillations and controllers. During these periods a damping controller may be activated, which can monitor the active power flow or voltage at some point of the grid to calculate if the system oscillates.

The amount of curtailment of the active power produced can be based on a prescription which may vary from one fault event to the other, e.g. provided by the grid provider. Alternatively, amount of curtailment may be predetermined and the same for all the post-fault-support stages. The prescription may be expressed in absolute terms (for example: 'Reduce the power produced by x MW'; x being a number) or in relative terms (for example: 'Reduce the power produced by x %; x being a number between 0 and 100). In the latter case, the relative prescription may refer to the plant's nominal active power (for example: 'Reduce the power produced by x % of the wind power plant's nominal power). In other embodiments, the relative prescription refers to the active power the plant could produce under the currently prevailing wind (for example: 'Reduce the power produced by x % of the power which could be produced by the wind power plant under the currently prevailing wind).

Frequency support of the electric grid may also be based on a prescription by the grid provider of an upper frequency limit at which the wind power plant has to reduce its active-power out, and, optionally, a lower frequency limit at which the wind power plant has to produce additional active power (a wind turbine operating at the maximum producible power cannot increase its active power; therefore, any increase of the active power produced on demand can only provided by embodiments which are able to operate in a curtailed mode). In other embodiments, the upper frequency limit (and the lower frequency limit, if applicable) is predetermined and the same for all the post-fault-support stages.

All these different prescriptions can be provided as reference values (also referred to as "target values" or set points") to the plant controller online by means of a communication link between the grid provider's control center and/or offline by agreement on fixed reference values or a schedule in which the reference values are indicated for different future dates and times. The grid provider does not have to make all the prescriptions or provide all the reference values described above. In some of the embodiments, at least one of the following is provided: an absolute-reactive-power reference value, a relative-reactive-power reference value, a voltage-level reference value, an absolute-active-power curtail meant reference value, a reactive-active-power reference value, and an active-power reference value as a function of grid frequency.

The plant controller transforms the grid provider's requirements represented by the grid provider's reference values, and/or the predetermined requirements, into reference values of one or more electric-production parameters for the local-wind turbine controllers of the individual wind turbines in the wind power plant. In some embodiments, the reference values to the wind turbines are the absolute levels of reactive power (Q, e.g. in MVAR) and/or active power (P, e.g. in MW) for each individual wind turbine. Alternatively, the absolute values may also be expressed in relative terms, e.g. as percentage of the nominal power or current producible by the wind turbine at issue. In other embodiments, for example, the reactive-power reference may be expressed in relation to the active power or current, e.g. represented by a power factor (cos $\phi$) (optionally including an indication whether the reactive should be capacitive or inductive), or a phase angle ($\phi$). Reactive-power production by the individual wind turbines may also be represented by a voltage-reference value which indicates a voltage that has to be achieved by the wind turbine at its terminals. In some embodiments, for example, the active power reference may be relative, e.g. in the form of a relative curtailment level prescribing that the active power produced should be a certain fraction (e.g. 95%, or some percentage in the range from 80%-98%) below the active power producible by the wind turbine at issue at the currently prevailing wind speed.

In some embodiments a scheduler, which is a functional module of the central plant controller, is responsible for this conversion from plant-related reference values to individual reference values for the wind turbines. The scheduler may also take into account information obtained from the wind turbines, e.g. their current active and reactive power production, their currently possible active power production (if they run in a curtailed mode) etc. In some embodiments, the scheduler may also take into account known impedances of the internal-grid connections between the wind turbines and the PCM, since these impedances generally modify the relative amounts of active and reactive power (or the power factor, or phase angle) emitted at the wind turbine's terminals to different values at the PCM.

In the simplest case, the scheduler divides absolute plant-related reference values by the number of wind turbines to obtain the corresponding individual reference values for the wind turbines. For example, if a plant-related reference value indicates that the wind power plant, which, for example, consists of ten wind turbines of equal nominal power, has to provide 1 MVAR reactive power, the scheduler may produce the same reference value (in this example: 0.1 MVAR) for each of the wind turbines. However, in other embodiments the scheduler may determine reference values not for all the wind turbines of the wind power plant. For example, the wind turbines in a first row of a wind power plant will normally be subjected to higher wind speed than the turbines of the second and subsequent rows, since the energy extracted by the wind turbines of the first row cause the wind speed to be reduced, etc. If the wind turbines of the first row already operate at or beyond nominal power, while the wind turbines of the second, third . . . rows still operate in the partial-load mode, in some embodiments the scheduler commands the wind turbines of the second, third . . . rows to produce a bigger fraction of the reactive power to be produced by the wind power plant than the wind turbines of the first row, because the converters of the former can take up more additional current for producing reactive power before reaching their current limit than the converters of the latter.

In the embodiments, during normal operation, before a grid fault occurs, the individual wind turbines of a wind power plant are controlled by the plant controller. As described above, the plant controller provides reference values of one or more electric-production parameters, such as the active power, the reactive power, and/or the voltage to be produced to the individual wind turbines of the wind power plant. This mode, in the absence of a low-voltage fault, in which the wind turbines operate according to the at least one reference value of one or more electric-production parameters provided by the central plant controller, is also referred to as a "nominal-grid operation mode".

The wind-power plant of some of the embodiments is configured to operate in three stages during and after a low-voltage grid fault, a fault stage, then a post-fault-support stage, and a nominal-grid operation stage after the post-fault-support stage. The number of three stages is not necessarily exhaustive; in some embodiments there may be one or more further stages before, after, or inserted between the three stages described herein. In some embodiments, each stage corresponds to a single state of the plant controller and/or wind-turbine controllers. Entering or leaving a stage therefore means entering or leaving the corresponding state. In other embodiments, one or more of the stages are composed of a plurality of states of the plant controller and/or wind-turbine controllers. For example, as will be explained below, in some embodiments the post-fault support stage is made up of a post-fault state and a regain-control state of the plant controller.

Fault Stage:

One of the basic requirements of many grid codes all over the world is that a wind turbine must not disconnect from the grid and shut down during a low-voltage grid fault but must ride through the low-voltage dip. However, wind turbines are allowed to disconnect and shut down if the low-voltage situation is persistent. Grid codes usually provide a limit curve of the voltage as a function of time. FIG. 1 shows an exemplary voltage curve of the voltage pattern from the E.ON grid code 2006 mentioned at the outset. If the voltage stays above the limit curve a wind turbine must not disconnect. If it falls below the limit line, i.e. enters the shaded region, disconnection is allowed. Many current grid codes of other grid providers or countries define a similar requirement, e.g. the grid codes of Ireland, Spain, the UK, etc.

In the embodiments, the central plant controller and/or the local wind-turbine controllers are configured to provide a low-voltage ride through capability during a fault stage.

In some of the embodiments, the central plant controller and/or the local wind-turbine controllers are configured to enter the fault stage when a low-voltage fault is detected. In some of the embodiments the wind-turbine controllers will not follow any references from the central-plant controller during the fault stage. In some embodiments, the fault stage is entered when the grid voltage at the PCM and/or at the wind turbine at issue drops below the nominal grid-operating range, or below another enter-fault threshold. In some embodiments the voltage drop must also continue for a certain minimum time interval, e.g. for at least 10-100 ms for the fault stage to be entered.

The central plant controller and/or the local wind-turbine controllers are configured to leave the fault stage towards the post-fault-support stage, if the voltage returns to the nominal grid-operating range, or another leave-fault threshold (which is normally above the enter-fault threshold, to provide a hysteresis) within a predetermined maximum fault duration (for example within about 1 to 2 seconds). In some embodiments, the fault stage is not immediately left when the voltage returns but is extended over a fault-return-delay period, e.g. of 500 ms, after the voltage has returned.

In some embodiments the central plant controller is configured to also control the wind turbines during the fault stage to ride through the grid fault.

In other embodiments, the central plant controller and the local wind-turbine controllers are configured such that the central control by the plant controller is replaced by local control carried out by the wind turbines during the fault stage; i.e. the wind turbines' local wind-turbine controllers are configured, during the fault stage, to operate the wind turbines autonomously with regard to their electric output to ride through the grid fault.

In the embodiments the wind turbines ride through the fault during the fault stage, i.e. they do not shut down, and remain connected to the grid, as a consequence of the fault. In some of the embodiments no further requirement is imposed on the wind turbines; i.e. the wind turbines are not required to supply any active or reactive power during the fault stage. This is compliant, for example, with the Spanish grid code "Resolución de 11 febrero de 2005; P.O. 12.2; Instalaciones conectadas a la red de transporte: requisitos minimos de diseño, equipamiento, funcionamiento y seguridad y puesta en servicio", point 3, BOE no. 51, p. 7405-7430.

In other embodiments the wind turbines not only have to provide the fault-ride through functionality but, in addition, supply reactive current to the grid during the fault stage to support the grid. The reactive-current supply during the fault stage is based, in some embodiments, on central plant control; in other embodiments it is based on autonomous control by the local wind-turbine controllers. In some embodiments the reactive current to be produced is capacitive reactive current. A variable-speed wind turbine is normally equipped with a (full- or partial-scale) converter, e.g. comprising a generator-side inverter, a grid-side inverter and a DC link between the inverters with voltage source (e.g. a capacitor). The grid-side inverter with the voltage source can function like a STATCOM (static synchronous compensator) and can therefore act as a source of reactive current.

In some embodiments, one or more static synchronous compensators (STATCOMs) are provided in the wind-power plant. A static synchronous compensators may have a capacitance (e.g. a bank of capacitors), a converter which couples the capacitance to the internal grid, and a local controller controlling the converter. In some of these embodiments, production of reactive current, in particular during the fault stage, is performed by the static synchronous compensator(s) alone. In other of these embodiments the wind-turbine converters and the static synchronous compensator(s) produce the required reactive power, or current, jointly. Control of the static synchronous compensator(s) to produce reactive current or power is performed analogous to that of the wind-turbines; i.e. in some embodiments by the central plant controller, in other embodiments by the local STATCOM controller(s).

There are certain limitations for wind-turbine and STATCOM converters regarding the production of reactive current: if the synchronization with the grid is lost during a fault, no reactive current can be delivered. The converter may block for a certain period of the fault stage, as a self-protection measure. Moreover, any wind-turbine or STATCOM converter normally has a current limitation. A certain fraction of the maximum-allowed current may have to be used to enable the wind turbine used to discharge its active power into the grid. The current limitation then limits the production of reactive current during a fault to the remaining current margin under the current limitation.

In some embodiments maximum reactive current is supplied in response to a grid fault, as required by some grid codes. In view of the current and timing limitations explained above, "maximum reactive current" is that amount of reactive current which can be produced under the current limit of the wind turbine's converter, and depending on whether the converter is synchronized with the grid at all. Embodiments which supply maximum reactive current are compliant with a broad class of grid codes, examples of which are the UK "The Grid Code", Issue 4, Revision 10, 2012, point CC.6.3.15, and the Irish "EirGrid Grid Code", version 3.5, 2011, point WFPS1.4.

In still other embodiments a supply of maximum reactive current is not required during the fault stage, but rather an additional amount of reactive current is supplied by the wind turbine (or STATCOM) which depends on the grid voltage during the fault stage. The greater the deviation from the nominal grid voltage is, the higher is the amount of additional reactive current to be supplied by the wind turbine (or STATCOM). "Additional reactive current" is the reactive current produced in addition to the reactive current produced before the fault. The term "additional reactive current" also applies to cases in which no reactive current was produced before the fault; it then simply refers to the total reactive current produced during the fault stage (because the additional reactive current is "added" to zero reactive current). In some embodiments this relationship between voltage deviation and additional-reactive-current production is linear; the additional-reactive-current production then corresponds to linear voltage control. In the case of saturation, i.e. if the depth of the voltage dip would require more reactive current than the rated maximum current, the rated maximum current is produced to provide reactive current. In some embodiments there is a dead-band in the nominal voltage range; i.e. no additional reactive current is produced once the voltage is within the nominal-voltage band. Once the voltage rises again during the fault stage (above the saturation voltage) the reactive-current production is reduced, e.g. in accordance with the linear relationship.

Figure 2:
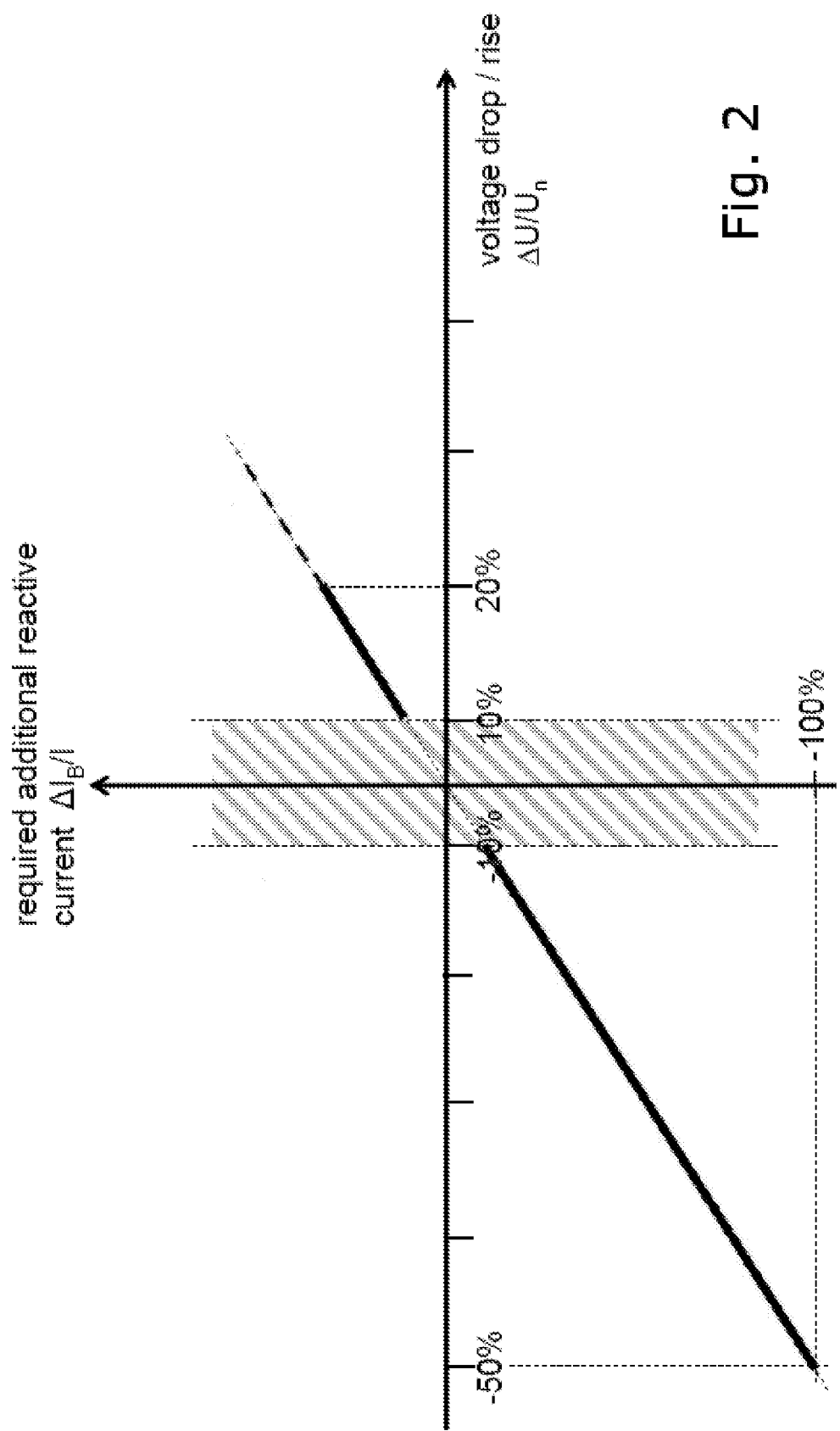
FIG. 2 illustrates a relationship between the grid voltage and additional reactive current produced in some embodiments which perform voltage control during the fault stage.

Voltage control during the fault stage according to some embodiments is illustrated in FIG. 2: voltage control to produce additional reactive current (here: capacitive current) is activated in the event of a voltage dip below the nominal-voltage range; e.g. below a value of about 5% to about −20% below the nominal grid voltage $U_n$ (in FIG. 2 it is shown to be at 10%). The amount of additional reactive current produced depends linearly on voltage deviation from the nominal voltage. In the example shown in FIG. 2, an amount of 2% of the rated maximum current the wind turbine (or STATCOM) can deliver is produced for each percent of the voltage dip. Assuming that no reactive current was produced before the fault, saturation is reached at voltage dips to 50% of the nominal voltage and below, which means that reactive current corresponding to the rated maximum current is produced. Once the voltage rises again during the fault stage above the saturation voltage (e.g. 50%) the reactive current production is reduced in accordance with the linear relationship illustrated in FIG. 2. In some embodiments, if the voltage rises above the nominal voltage, and beyond the upper limit of the nominal-voltage band (e.g. beyond 110% of the nominal voltage), additional capacitive current is produced which, e.g., depends linearly on voltage deviation from the nominal voltage in accordance with the same linear relationship. This is also illustrated in FIG. 2. Embodiments which provide voltage control during a grid fault, for example as in FIG. 2, are compliant with another class of grid codes, an example of which is the E.ON 2006 grid code mentioned at the outset.

As already mentioned, in some embodiments the central plant controller is configured to also control the wind turbines (and the STATCOM(s), if applicable), in the event of a low-voltage grid fault, to ride through the grid fault.

In other embodiments, in the event of a low-voltage grid fault, the central control by the plant controller is replaced by local control (also referred to as autonomous control) carried out by the wind turbines themselves (and STATCOM(s), if applicable) during the fault stage, in order that the wind turbines ride through the low-voltage fault. Local control means that the wind turbines do not follow the reference values of one or more electric-production parameters, such as the active power, the reactive power, and/or the voltage to be produced, provided by the plant controller anymore, but control supply of reactive and/or active current themselves (the same applies to STATCOM(s), if applicable, regarding the reference values mentioned except the active power). In some embodiments, the plant controller therefore ceases to provide, or update, these reference values during the fault stage since the autonomously operating wind turbines (and STATCOM(s), if applicable) would not follow them during the fault stage anyway.

In some embodiments, regardless of whether control during the fault stage is central or local, the grid-fault detection is performed by the plant controller. Once the plant controller detects a voltage dip which fulfils the definition of a grid fault (the voltage drops below the enter-fault threshold and may possibly persist for a minimum-time interval), it decides that the fault stage is to be entered and changes its reference values to fault-stage reference values (in central-fault-stage-control embodiments), or commands the wind turbines of the wind power plant accordingly, which thereupon commence autonomous fault-stage control (in local-fault-stage-control embodiments). In some of these embodiments the voltage which is measured by the plant controller in order to trigger this change is the grid voltage at the PCM, e.g. the PCC.

In other embodiments with local fault-stage control, the grid-fault detection which causes the wind turbines (and the STATCOM(s), if applicable) to enter the fault stage is performed locally by the wind turbines (and the STATCOM(s), if applicable). Once a wind-turbine (or STATCOM) controller detects a voltage dip which fulfils the definition of a grid fault (the voltage drops below the enter-fault threshold and may possibly persist for a minimum-time interval), it decides autonomously that the fault stage has been reached and starts autonomous fault-stage control. In some of these embodiments the voltage which is measured by the wind-turbine (or STATCOM) controller in order to trigger this change is the voltage of the internal plant grid at the wind turbine's (or STATCOM's) terminals (e.g. at the high voltage side of the wind turbine's transformer), or the voltage at the low-voltage side of the wind turbine's transformer.

In some embodiments, when the fault has been cleared, the fault stage is terminated and a transition is made to the post-fault-support stage. A fault is considered to be cleared, for example, when the grid voltage has returned to what is called a voltage-return threshold, which may, for example, be the lower limit of the nominal grid-operating range, or a voltage below it, to ensure a hysteresis effect. For example, the voltage-return threshold may be in the range of 0-15% of the nominal voltage below the lower limit of the nominal grid-operating range. In some embodiments, when the grid voltage returns to the voltage-return threshold, the fault stage is not immediately terminated, and the transition is not immediately made but only after a delay, e.g. in the range of 100 ms to 1.5 s after the grid voltage has returned to the voltage-return threshold.

In some embodiments with local fault-stage control the activities of testing whether the grid voltage has reached the voltage-return threshold and of determining whether the transition to the post-fault support stage is to be made are still performed by the local wind-turbine (or STATCOM) controller.

In other embodiments with local fault-stage control and embodiments with central fault-stage control these activities are carried out by the central plant controller. When the central plant controller decides that the transition is to be made it sends a corresponding command (e.g. referred to as an "enter post-fault command") to the wind-turbine controllers of some or all of the wind power plant's wind turbines (and/or the STATCOM controller(s), if applicable). In embodiments with local fault-stage control the local wind turbine controllers—although controlling the wind turbines autonomously during the fault stage—may listen to the plant controller during the fault stage and cease local control in response to the enter post-fault command.

In some of the local-fault-stage-control embodiments in which the test whether the grid voltage has reached the voltage-return threshold is performed by the local wind-turbine (or STATCOM) controller, the grid voltage which is tested against the threshold is the voltage of the internal plant grid at the wind turbine's (or STATCOM's) terminals (e.g. at the high voltage side of the wind turbine's transformer), or the voltage at the low-voltage side of the wind turbine's transformer. In other embodiments of this type the grid voltage which is tested against the threshold is the voltage at the PCM. The voltage measured at the PCM is measured by, or under the supervision of, the plant controller, and an information signal representative of the measured grid voltage at the PCM is sent to the local plant controllers.

In some of the embodiments in which the test whether the grid voltage has reached the voltage-return threshold is performed by the central plant controller, the grid voltage tested against the threshold is the voltage measured at the PCM.

Post-Fault-Support Stage:

As indicated at the outset, a return from the fault operation with the pre-fault reference values immediately after the fault has been cleared may be contraindicated for the further recovery of the grid. This is because, for example, an impedance change may have happened, or grid stability may be lower, as a consequence of the grid fault, which may, at least initially, not known to the plant controller.

Since it is not known in advance whether, and in which direction (inductive or capacitive), the grid impedance has changed as a consequence of a fault, during the post-fault support stage control is performed by the central plant controller which controls the wind power plant to operate in a manner supporting the further grid recovery.

"Supporting" means that the wind power plant is controlled to (i) to provide only real power (power factor=1), or (ii) perform voltage control with a voltage reference supporting grid recovery.

Accordingly, in some embodiments the central plant controller is configured to control the wind power plant during the post-fault support stage to provide only real power, no reactive power. Providing only real power is an operation in a neutral manner is not at least contraindicated for grid recovery.

In other embodiments the central plant controller is configured to control the wind power plant during the post-fault support stage to perform voltage control with a voltage reference supporting grid recovery. Injection of reactive power will generally increase or decrease the grid voltage at the PCM depending on whether capacitive or inductive reactive power is injected, and on whether the impedance of the grid is predominantly inductive or capacitive.

In these voltage-control embodiments, various different voltage references may support the grid recovery, depending on the circumstances. For example, in one exemplary embodiment the central plant controller is configured to performed voltage control with the nominal grid voltage as the voltage reference. This means the central plant controller attempts to keep the voltage value, e.g. at the PCM, at the nominal grid voltage, by injection of reactive power.

In another example of a voltage-control embodiment the central plant controller is configured to perform voltage control with the previous voltage value of the grid before the fault happened as the voltage reference, close to the nominal grid voltage (e.g. within a range of 0.95 to 1.05 of the nominal voltage). This may be motivated by the fact that other voltage regulators in the grid, such as tap changers which adapt ratios of primary and secondary transformer windings are commonly very slow. For example, if the grid is working with a voltage of 1.02 pu (=2% above nominal) before the fault, all the tap changers of the system are adapted to this value after the fault, so (in some cases depending on the grid topology) it can be beneficial to use this voltage (1.02 pu) as the voltage reference during the post-fault support stage. Otherwise, using the nominal grid voltage as the voltage reference could cause an under-voltage at the secondary windings of the transformers (in the example mentioned, the under-voltage at the secondary winding would be at about 0.98 pu).

In a still other example of a voltage-control embodiment the central plant controller is configured to perform voltage control with the previous voltage value of the grid before the fault happened as the voltage reference, which may be further away from the nominal voltage than in the previous example. For example, the wind power plant can be "connected in antenna", meaning that the plant is connected to the transmission grid through a long branch line. Since nobody is connected the branch line (except the wind power plant itself) there is no need to have nominal grid voltage at the point of common coupling. In this case, by choosing a higher voltage reference, the voltage after the branch line (where it is connected to the transmission grid) can be improved, which may support grid recovery.

In all these voltage-control embodiments an attempt is made to keep the voltage value, e.g. at the PCM by closed-loop control at the reference voltage, by injection of reactive power. In some of these embodiments, the post-fault-support stage comprises measuring a voltage at the PCM, comparing the measured voltage with the reference voltage, and adjusting, by the central plant controller, a reference value for reactive-power or reactive-current production to counteract any deviation of the measured voltage from the reference voltage. For example, the voltage at the PCM is repeatedly measured, compared with the desired voltage level at the PCM (here: the nominal grid-voltage), an error signal representing the deviation of the measured voltage from the nominal grid voltage is generated, and the error signal causes reactive power with a level and sign (inductive or capacitive) to be produced by the wind turbines which is suitable to counteract the deviation from the reference voltage.

If only active power is produced during the post-fault-support stage two different exemplary controller implementations options are:

use of a power-factor controller where the reference is power factor PF=1; this controller will use the measured active and reactive power at plant level (e.g. at the PCM) and the reference power factor to calculate the right Q to be produced by the wind turbines (and the STATCOM, if applicable) needed to achieve PF=1 at the PCM;

use of a reactive-power controller, where the reference is 0 pu reactive power; this controller will use the measured reactive power at plant level (e.g. at the PCM) together with the reference-reactive power to calculate the right Q to be produced by the wind turbines (and the STATCOM, if applicable) needed to achieve Q=0 at the PCM.

If voltage control with a voltage reference of 1 pu, or any other supporting voltage reference, is performed during the post-fault-support stage, an exemplary controller implementation uses as feedback the voltage measured at plant level (e.g. at the PCM). This controller uses a comparison of the voltage measured at the PCM and the voltage reference to adapt the Q so that the voltage at the PCM equals, or at least approaches the voltage reference.

In some embodiments active power is injected during the post-fault support stage as in the normal operation. For example, at wind speeds at or above the nominal wind speed of the wind turbine at issue, nominal active power is produced, and at wind speeds below the nominal wind speed the active power produced corresponds to the amount obtainable at the given wind speed. In embodiments in which nominal-voltage control is activated during the post-fault-support stage, the active power may be reduced if a current limit of the wind-turbine converter does not enable the required active and reactive current to be produced. Moreover, since the post-fault-support stage directly succeeds the fault stage, a transient in the active-power production will still be present during the post-fault-stage. For example, in some embodiments the amount of active power produced is still ramping up during the post-fault-support stage from a low value (which is due to the fact that during a low-voltage event only a reduced amount of active power, or even no active power, can be injected) towards the above-mentioned active-power production during normal operation.

During the post fault stage the active power can be controlled to provide grid stability. For example, the plant controller can activate during this stage a curtailment operation and/or activate frequency control. Additionally or alternatively, plant controller can activate a damping controller during this stage to damp grid oscillations (frequency oscillations) detected at the PCM. Typically, after a fault conventional plants can oscillate due to the shaft oscillations and/or control influence. The dampening controller counteracts frequency oscillations by injection oscillating active power with a counter-phase; thus a dampening controller will support the system stability. After this period the plant controller can change to maximum tracking power from the available wind.

Control of the individual wind turbines (and the STATCOM(s), if applicable) is performed by the central-plant controller during the post-fault-support stage. The central plant controller provides at least one reference value commanding the individual wind turbines to operate in a neutral or supporting manner, i.e. to produce no reactive power or perform voltage control according to a voltage reference.

Therefore, in embodiments with local control during the fault stage, when the transition from the fault stage to the post-fault-support stage is made, control is switched from local wind-turbine control by the local wind-turbine controllers to central plant control by the plant controller. Moreover, in some of the embodiments with local voltage control during the fault stage the measured grid voltage on which the voltage control is based is the voltage of the internal plant grid at the wind turbine's terminals or the voltage at the low-voltage side of the wind turbine's transformers during the fault stage, while it is the grid voltage at the PCM during the post-fault-support stage.

However, in embodiments with central control during the fault stage the central plant controller controls the local wind-turbine controllers (and STATCOM controller(s), if applicable) during all the three stages (failure stage, post-fault-support stage, normal-operation stage) without relinquishing control to the local controllers during the fault stage.

Nominal-Grid-Operation Stage:

Finally, after the post-fault support stage the wind power plant enters a nominal-grid operation stage (also referred to as normal-operation stage). The nominal-grid operation mode, which prevailed before the low-voltage fault, is resumed. This normal-operation stage is characterized in that the control configuration is the one demanded by the customer or grid operator as a default; it may differ from the supporting voltage control or only-active-power injection activated during the post fault stage. Therefore, reference values no longer bound to the neutral-operation reference values or the supporting-operation reference values of the post-fault-support stage are now provided by the plant controller. In some embodiments, the reference values reflect what is demanded by the grid provider. The reference values may be the same as before the fault. Alternatively, the post-fault reference values may differ from the pre-fault reference values. For example, a persistent change of the status of the grid, such as a change of the grid impedance from pre-fault to post-fault may be taken into account, which may require a change in the reactive-power production. Changes in the amount of power consumption and/or changes of the amount of power production in the grid may require a change in the active-power production by the wind energy plant or a change in the degree of curtailment.

In some embodiments, the post-fault-support stage is left and the nominal-grid operation mode is resumed in response to the expiry of a time interval started when the post-fault-support stage was entered. In other words, the time interval represents the duration of the post-fault-support stage. In some of these embodiments, the time interval is predetermined, i.e. had already been set before the fault occurred. In other embodiments the length of the time interval depends on the severity of the fault, e.g. the deeper the voltage dip is, the longer the time interval is. The dependency of the length of the time interval on the depth of the voltage dip may be according to a predetermined function. It is common to these embodiments that the duration of the post-fault-support stage is independent of the actual development of the grid recovery.

However, in other embodiments the duration of the post-fault-support stage depends on the actual development of the grid recovery. For example, in some of these embodiments at least one grid parameter is monitored during the post-fault-support stage. If it is determined that the at-least-one monitored grid parameter has assumed a value indicative of nominal-grid conditions, the post-fault-support stage is left and the nominal-grid operation mode is resumed.

In some embodiments the grid parameter is an electric parameter of the grid, for example the grid voltage and/or the grid frequency. In some embodiments, when the grid voltage and/or the grid frequency has returned to its nominal voltage and/or frequency range, the nominal-grid operation mode is resumed. In some embodiments an additional condition is to be fulfilled to resume the nominal-grid operation mode, that is to say that the grid voltage and/or the grid frequency has remained within that range for a certain period of time indicative of stable nominal-grid conditions (e.g. ranging from 2 to 60 seconds). In other embodiments, the absolute values of the grid voltage and/or the grid frequency are not, or not completely, decisive. It is rather (alternatively or additionally) the result of monitoring oscillations of the grid voltage and/or the grid frequency on which the resumption of the nominal-grid operation mode is based. This is because during grid recovery after a fault there is sometimes a period of instability which often shows up in such oscillations. Consequently, in some embodiments oscillations of the grid voltage and/or the grid frequency are monitored, and when the oscillation amplitude has decreased below an oscillation threshold indicative of grid stability, and, possibly, has remained below this threshold for a certain delay period (e.g. ranging from 2 to 60 seconds) the nominal-grid operation mode is resumed.

In other embodiments the electric grid parameter monitored is the impedance of a relevant part of the grid, e.g. of a connecting transfer line which connects the wind power plant to the main part of the grid. The impedance at issue can be determined by the plant controller, for example, based on knowledge of the part of the grid at issue and grid elements, and signals received by the plant controller representing the current setting of impedance-changing grid elements, such as breakers, switches, transformer taps, etc. When the impedance assessment has revealed that the impedance is within an impedance range for nominal operation and, optionally, has remained in that range for a certain delay period (e.g. ranging from 2 to 60 seconds) the nominal-grid operation mode is resumed.

In still other embodiments the grid parameter is an information signal from the grid provider received during the post-fault-support stage which indicates that the grid has recovered. Upon receipt of this signal the nominal-grid operation mode is resumed in these embodiments.

Generally, the central plant controller and the local wind-turbine controllers have many other functions besides the low-voltage-ride-through functionality. Accordingly, in some embodiments the central plant controller comprises different control program functions, one of which is responsible for the low-voltage-ride-through functionality.

In some embodiments, the different stages during low-voltage ride through are represented in the central plant controller by different states. Correspondingly, the part of the control program responsible for the low-voltage-ride-through functionality is a state machine implementing different control states, referred to as a low-voltage-ride-through state machine. The control states of the low-voltage-ride-through state machine may comprise:

(a) a fault state active during the fault stage;
(b) a post-fault state active during the post-fault-support stage;
(c) a normal-operation state active during the nominal-grid operation stage.

In some embodiments the state (c) (normal operation) is not implemented as a part of the low-voltage-ride-through state machine, as it belongs to normal operation of the wind power plant. As an alternative, some of the of the low-voltage-ride-through state machine therefore have a state (c') instead, a 'regain-control' state active during transition from the post-fault-support stage to the nominal-grid operation stage, to enable the low-voltage-ride-through machine nevertheless to support the transition from post-fault state to nominal-grid operation. The regain-control state (c') is a transitional state between the post-fault state and nominal-grid operation.

Even if voltage control is performed by the central plant controller during two or three of the stages or states, the fact that the central plant controller is configured, in some embodiments, to perform voltage control in each of these stages or states individually and independently from other stages or states, the voltage control parameters can be chosen differently in all the stages or states, which enables the fault ride-through and the grid recovery to be performed in an improved and flexible manner. Voltage control parameters used in voltage control which may be chosen differently are the voltage reference and/or the slope, or droop, of the function of the reactive power/current vs. the measured voltage (an example of such a droop function is shown in FIG. 2; the slope of this function is 0.5% of additional reactive current per 1% deviation of the voltage from the nominal voltage).

In some of the embodiments with local control during the fault stage, i.e. embodiments in which the plant controller's control function is taken over by the local wind-turbine controllers (and STATCOM controller(s), if applicable) during the fault stage, the central plant controller is configured, upon entering the fault stage, to "freeze" a state of at least that part of the central plant controller which provides control of electric production in the nominal-operation and store a pre-fault-operation value of at least one control variable. "Freezing" means that the state is not varied. This stored and frozen control variable may be at least one of the following: a reactive-power reference value, an active-power reference value, and an integrator component of the plant controller. Upon resumption of the nominal-grid operation mode, in some embodiments the freezing of the central plant controller is suspended, and central plant control is resumed using the at-least-one stored control-variable value from pre-fault operation. Freezing may be performed in embodiments in which the wind turbines are not listening to the central plant controller during the fault stage; otherwise, in other embodiments with control by the plant controller during the fault stage the central plant controller can go through the different stages with their different control states without freezing.

In embodiments of this sort with a state machine the "fault state" may also be referred to as a "freeze-control state".

In local-control embodiments, during the fault stage the wind turbines (and STATCOM(s), if applicable) no longer follow any reactive-power reference by the plant controller, as control is transferred to the local wind-turbine (and/or STATCOM) controllers. In some embodiments the plant controller has an integrating component (it is, for example, a PI or PID controller). The plant controller may include a feed-back voltage controller which aims at keeping the voltage at the PCM at a target value by evaluating an error signal based on a difference between the actual PCM voltage and the target PCM voltage and providing a suitable reactive-power reference to the individual wind turbines to counteract any such voltage difference. The integrating component of the voltage controller, for example, integrates the voltage difference. The error signal then has a component corresponding to the integral of the voltage difference. In these embodiments "freezing" may mean preventing the integral term of the controller from accumulating. When the plant controller's function is taken over by the local wind-turbine controllers during the fault stage, the wind turbines no longer follow any reactive-power reference by the plant controller. In order to prevent the integrator from continuing to accumulate and, finally, to become saturated, in some of these embodiments the integrator is frozen, in other words the frozen-controller state comprises a reactive-power reference value and/or an integrator component of the PCM-voltage controller of the plant controller. The stored pre-fault-operation value of the at-least-one control variable may be a pre-fault integrator-component value which is used again when the wind power plant and the central plant controller return to normal operation, i.e. nominal-grid operation.

The above description of general aspects of embodiments, and the subject-matter of the dependent claims, although presented in relation to a wind power plant, also relate to the method itself which is implemented in the central plant controller, and, in embodiments with local control during the fault stage, partially in the local wind-turbine controllers (and STATCOM controller(s), if applicable).

The central plant controller and the local wind-turbine controllers may, for example be control computers each with a central processing unit (CPU), memory for the control programs and data, an input/output (I/O) interface, and a data bus connecting the CPU, the memory, and the I/O interface.

In some embodiments, the control system is a distributed system, for example, in the form of several microprocessors connected to each other; e.g. one or more microprocessors for the plant controller and/or one or more microprocessors for each wind turbine.

In some embodiments, the notion that a controller is "configured" to carry out a certain activity means that the controller, i.e. the control computer is programmed to carry out this activity. For example, a control program for carrying out the method of controlling the electric output of a wind-power plant in the event of a transient low-voltage fault is implemented in the form of instructions and data stored in the memory of the control computer(s) in a non-transitory manner, and when the stored program is executed in the CPU of the control computer(s), the method is carried out.

Thus, in some embodiments expressions of the sort " . . . controller configured to carry out, or cause, some method-related activity" mean that the computer representing the controller at issue is programmed in a non-transitory manner so that the program causes the method-related activity to be carried out when the computer program is executed. The wind power plant defined in this manner is at least distinguished by this special programming (i.e. storage of this special computer program) from plants with the same hardware, if any, which are, however, not configured (e.g. not programmed) to carry out said method-related activities.

"Freezing" the central plant controller upon entering the fault stage has been described above as an optional function of local-control embodiments which can be added to the functionality described in the independent claims 1 and 14. However, the controller freezing functionality may also be useful in wind power plants and methods without a post-fault support stage, and is therefore claimed independently in claims 15 and 18. In the context of claims 15 and 18 the post-fault support stage is optional.

When the plant controller's function is taken over by the local wind-turbine controllers during the fault stage and the wind turbines, in some embodiments, enter the fault stage, a state of at least that part of the central plant controller which provides control of electric production in the nominal-operation mode is "frozen" and a pre-fault-operation value of at least one control variable is stored. "Freezing" means that the state is not varied. This stored, or frozen control variable may be at least one of the following: a reactive-power reference value, an active-power reference value, and an integrator component of the plant controller. Upon resumption of the nominal-grid operation mode, in some embodiments the freezing of the central plant controller is suspended, and central plant control is resumed using the at-least-one stored control-variable value from pre-fault operation.

In some embodiments, during the fault stage the wind turbines (and STATCOM(s), if applicable) no longer follow any reactive-power reference by the plant controller, as control is transferred to the local wind-turbine (and/or STATCOM) controllers. In some embodiments the plant controller has an integrating component (it is, for example, a PI or PID controller). The plant controller may include a feed-back voltage controller which aims at keeping the voltage at the PCM at a target value by evaluating an error signal based on a difference between the actual PCM voltage and the target PCM voltage and providing a suitable reactive-power reference to the individual wind turbines to counteract any such voltage difference. The integrating component of the voltage controller, for example, integrates the voltage difference. The error signal then has a component corresponding to the integral of the voltage difference. In these embodiments "freezing" may mean preventing the integral term of the controller from accumulating. When the plant controller's function is taken over by the local wind-turbine controllers during the fault stage, the wind turbines no longer follow any reactive-power reference by the plant controller. In order to prevent the integrator from continuing to accumulate and, finally, to become saturated, in some of these embodiments the integrator is frozen, in other words the frozen-controller state comprises a reactive-power reference value and/or an integrator component of the PCM-voltage controller of the plant controller. The stored pre-fault-operation value of the at-least-one control variable may be a pre-fault integrator-component value which is used again when the wind power plant and the central plant controller return to normal operation, i.e. nominal-grid operation.

In some of the freeze-controller embodiments the central plant controller comprises a low-voltage-ride-through state machine implementing different control states, comprising a freeze-control state active during the fault stage, and a normal-operation state, or a regain-control state active during transition to the nominal-grid operation stage. A post-fault state may be there, but is optional.

The optional subject-matter of the dependent claims 2, 4 to 12 can also be combined with the independent claims 15 and 18.

DETAILED DESCRIPTION OF EMBODIMENTS

Figure 3:
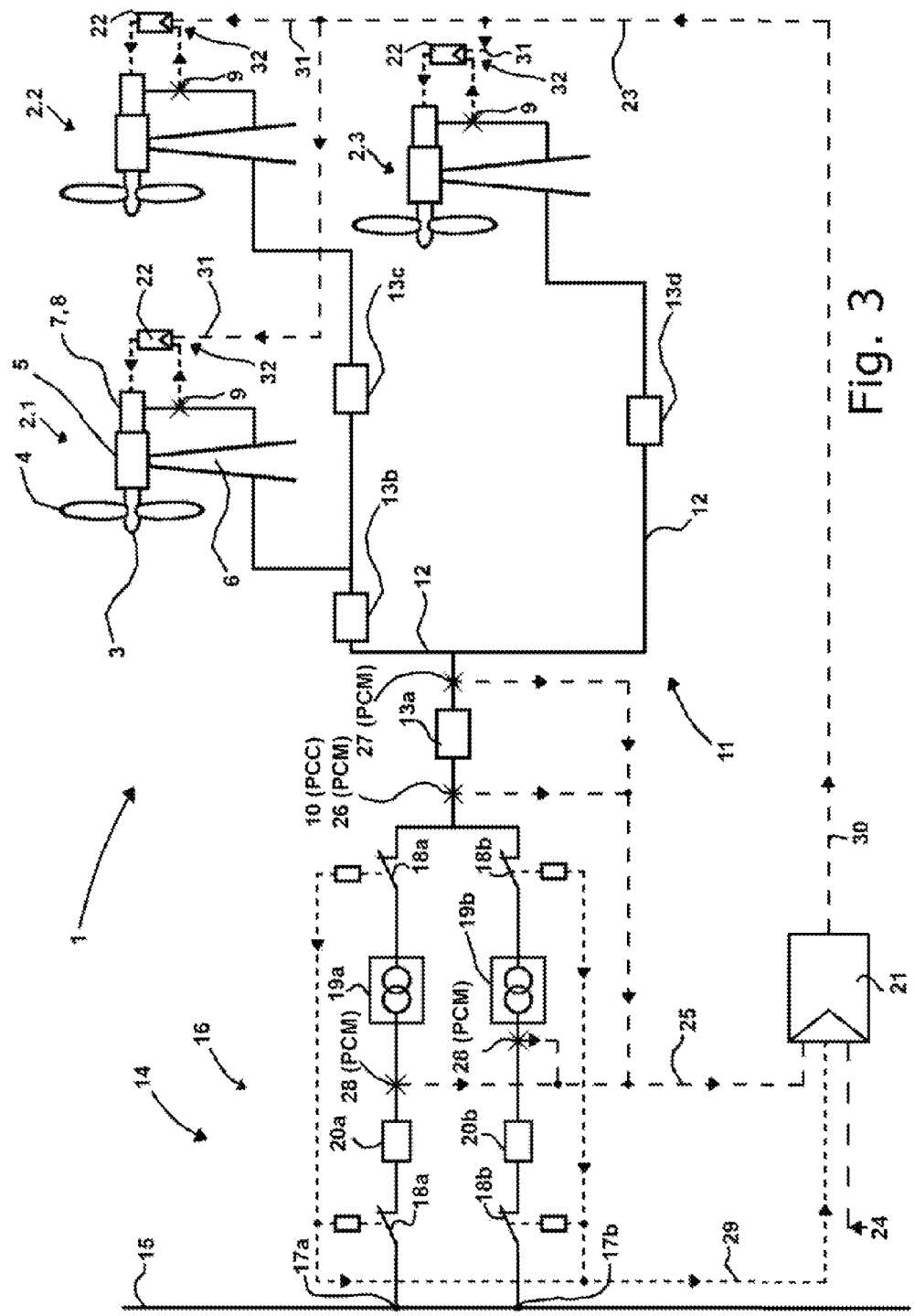
FIG. 3 is a schematic overview of an embodiment of a wind power plant.

FIG. 3: Wind Power Plant

The exemplary wind power plant 1 of FIG. 3 has a plurality of wind turbines 2, individually denoted by 2.1, 2.2, and 2.5. Each wind turbine 2 is has a rotor 3 with rotor blades 4 rotatably supported in a nacelle 5 which is mounted on tower 6. The rotor 3 drives a generator 7. In order to enable variable rotor speed the electric current produced by the generator 7 is converted by a converter 8 to current adapted to the fixed grid frequency (e.g. 50 Hz or 60 Hz), e.g. by a full-scale converter or a converter of a doubly-fed induction generator (DFIG). The converter 8 enables current to be produced with an arbitrary phase, as desired, relative to the grid voltage, thereby enabling variable reactive power to be produced. The converter 8 also allows the voltage amplitude produced to be varied within certain limits. Each wind turbine 2 has a local wind-turbine controller 22 that commands the wind turbine's converter 8 to produce electric current with a specific phase and voltage.

Each wind turbine 2 has terminals 9 at which the wind turbine 2 outputs the electric power produced. The wind turbines 2 of the wind power plant 1 are electrically connected to a point of common coupling (PCC) 10 by a plant-internal grid 11. Impedances of sections of internal lines 12 of the internal grid 11 are symbolized by boxes denoted by 13a-13d.

The PCC 10 is the point where the wind power plant 1 is electrically connected to the external utility grid 14. The utility grid 14 comprises, for example, a distant high-voltage transmission network 15 and a branch-line connection 16 by means of which the wind power plant 1 is connected to the distant high-voltage transmission network 15. The branch-line connection 16 may, for example, comprise two electrically parallel branch lines 17a, 17b. Each branch line 17a, 17b is equipped with switches 18a, 18b, for example at its ends. By means of the switches the network operator can take one of the branch lines 17a, 17b out of operation, for example in the event of a short-circuit in the branch line 17a, 17b at issue. Impedances of the branch lines 17a, 17b, which may include transformers 19a, 19b, e.g. located immediately downstream of, and connected with their secondary windings to, the PCC 10, are symbolized by boxes denoted by 20a, 20b.

The wind power plant 1 is equipped with a central plant controller 21. The central plant controller 21 communicates with local wind-turbine controllers 22 via a control network 23. The control network 23 is, for example, implemented as a bus system, i.e. a CAN bus (ISO 11898) or an Ethernet bus (IEEE 802.3). In FIG. 3, control lines are drawn as broken lines to distinguish them from power-grid lines drawn as full lines.

The central plant controller 21 has several inputs, three of which are illustrated in FIG. 3. One of the inputs is an external control input 24 through which an external entity, e.g., a utility grid operator can provide a prescription or demand information pertaining to the electricity to be delivered by the wind power plant 1. For example, the utility-grid operator can demand that the wind power plant 1 delivers a certain voltage V or amount of reactive power Q at the PCC 10 or another point in the internal grid 11, the branch line connection 16, or the transmission network 15. Other demands by the utility-grid operator may be an upper limit on the active power produced by the wind power plant 1, e.g. in the case of an over-frequency in the utility grid 14, or a curtailment level, which may be expressed in absolute or relative terms. The information signal for the external control input 24 is not necessarily a demand signal; in some embodiments it is a functional parameter which defines the central controller's response to parameters measured in the wind power plant 1. For example, in some embodiments it is the slope of a droop function defining a mapping of a measured voltage (cf. the next paragraph) to reactive power to be produced.

A second input to the central plant controller 21 illustrated in FIG. 3 is a central measurement input 25; it is, for example, a signal representing the voltage and/or reactive power measured at a point of common measurement (PCM) 26. The PCM 26 may coincide with the PCC 10. Alternatively, the PCM 26 may be upstream of the PCC 10 in the external grid 14 (e.g. in the branch-line connection 16 or the transmission network 15), or downstream the PCC 10 in the internal grid 11; marked by 27 and 28 in FIG. 3.

A third input to the central plant controller 21 is an impedance-indicating input 29. For example, the impedance-indicating input 29 receives a signal indicative of whether the branch line 17a and/or the branch line 17b is in operation or out of operation. This may be a signal indicating whether the switches 18a and/or 18b are in the closed or open state. Since the impedance of electric connection of the wind power plant 1 to the grid 14 (more specifically: the total impedance of the branch-line-connection 16 to the transmission network 15) is a combination of the impedances 20a, 20b the impedance of the branch-line-connection 16 depends on whether the branch line 17a and/or the branch line 17b is in operative, and will change if one of the branch lines 17a/17b is switched off.

The central plant controller 21 has a reference-value output 30 to the local wind-turbine controllers 22 via the control network 23.

The local wind-turbine controllers 22 may also have several inputs, two of which are illustrated in FIG. 3. One of the inputs is a reference-value input 31 which receives signals from the reference-value output 30 via the control network 23. The second input is a local measurement input 32. The signal representing the local measurement input 32 is, for example, the voltage and/or reactive power measured at the terminals 9 of the associated wind turbine 2. Measuring voltages and/or reactive power at a wind turbine's terminals 9 means that the voltage and/or reactive power is measured upstream the impedances 13a-13d of the internal lines 12 through which the respective wind turbine 2 is connected to the PCC 10, and that the reactive power measured is the reactive power produced by the wind turbine 2 at issue (not the sum of the reactive powers produced by the wind power plant 1, as at the PCM 26, 27, 28). Owing to the impedances 13a-13d the voltage measured at a wind turbine's terminals 9 will generally differ from the voltage measured by the central plant controller 21 at the PCM 26, 27, 28. Likewise, the sum of the reactive powers measured at the wind turbines' terminals 9 will generally differ from the reactive power measured by the central plant controller 21 at the PCM 26, 27, 28.

Both the central plant controller 21 and the local wind-turbine controllers 22 are arranged to work in a feedback mode in which they compare a reference value, e.g. from reference inputs 24, 31 with a measured value, e.g. from measurement inputs 25, 32, and produce a control signal based on the difference between the two input values.

The control network 23 is a bi-directional network enabling two-way communication between the central plant controller 21 and the local wind-turbine controllers 22. For example, the uplink direction (i.e. the direction from the central plant controller 21 to the local wind-turbine controllers 22) is used to send reference values, e.g., for voltage and/or reactive power, from the plant central controller 21 to the local wind-turbine controllers 22. The downlink direction may be used by the wind turbines 2 to return information about their current operational state, e.g. about the amount of active power currently produced, to the central plant controller 21 (only uplink arrows are drawn in FIG. 3).

The reference output 30 by the central plant controller 21 is, in some embodiments, a common reference value to all the wind turbines 2.1 to 2.3. In those embodiments, all the wind turbines 2 of the wind power plant 1 may be requested to produce the same voltage or reactive power, according to the common reference value. In other embodiments, the wind turbines 2 receive individual reference values from the central plant controller 21.

In embodiments with a STATCOM a capacitor bank is connected with the internal grid via a STATCOM converter, similar to the wind-turbine converters 8. The STATCOM converter is also coupled the control network 23 and receives reactive-power or reactive-current reference values signals from the plant controller's 21 reference-value output 30.

Figure 4:
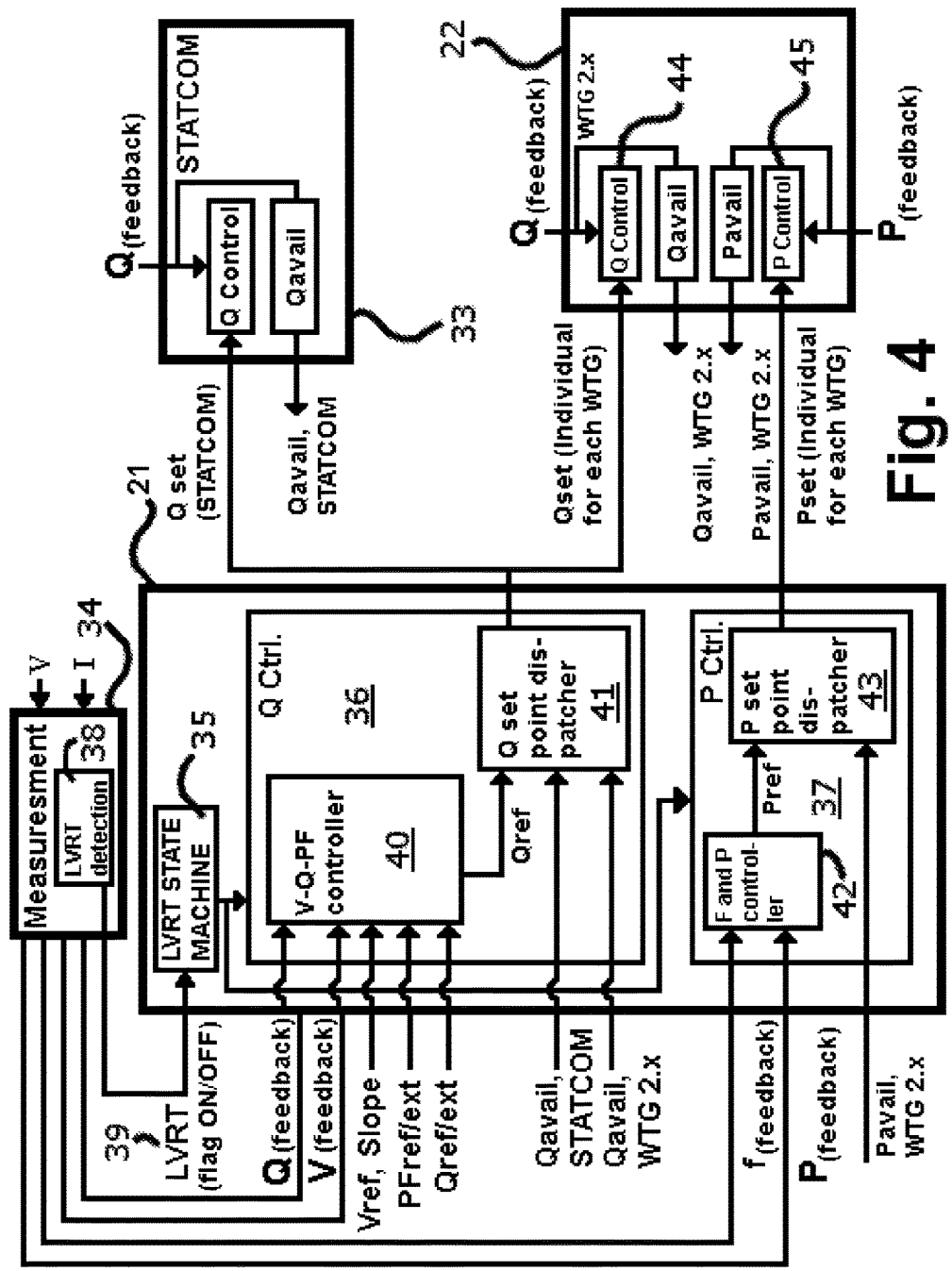
FIG. 4 is a diagram of a controller structure of the wind power plant of FIG. 3.

FIG. 4: Controller Structure

The overall controller structure of the wind power plant 1 comprises the central plant controller 21 and the local wind-turbine controllers 22. In the embodiment of FIG. 4, an optional STATCOM is also provided with a STATCOM controller 33.

A measurement evaluator 34 may be a separate unit and located at the PCM 26, 27, 28; in other embodiments it is a part of the central plant controller 21.

In the exemplary embodiment shown in FIG. 4, the central plant controller 21 comprises functional entities as follow: an LVRT control module 35 (LVRT stand for "low voltage ride through"), also referred to as an "LVRT state machine", a reactive-power controller 36 (briefly "Q controller"), and an active-power controller 37 (briefly "P controller").

The measurement evaluator 34 receives, as input signals 25 (FIG. 3), the measured voltage and current at the PCM 26, 27, 28 (FIG. 3) as functions of time. It comprises an LVRT detector 38 arranged to detect voltage drops. If the LVRT detector 38 ascertains that the voltage drops below an enter-fault threshold and persists there for a minimum-time interval it produce an LVRT flag 39 indicating that a fault has happened. In the example shown in FIG. 4, the measurement evaluator 34 also produces signals indicative of the reactive power, $Q_{(feedback)}$, and/or the absolute-voltage value $V_{(feedback)}$, and, optionally, the grid frequency $f_{(feedback)}$ and/or the active power $P_{(feedback)}$ from the input signals.

The LVRT state machine 35 receives the LVRT flag 39 and the controls the functionalities of the Q controller 36 and the P controller 37 in the event of a grid fault indicated by the LVRT flag 39, as will be described below. In some embodiments, the LVRT state machine 35 also receives a signal 29 (FIG. 3) indicative of the grid impedance 20a, 20b.

The Q controller 36 receives the signals produced by the measurement evaluator 34 which are relevant for Q control, that is $Q_{(feedback)}$ and/or $V_{(feedback)}$. Moreover, it receives external control inputs 24 (FIG. 3), here an external reference value for the active power $P_{ref,ext}$ to be produced by the wind power plant 1, an/or an external reference value for the reactive power $Q_{ref,ext}$ be produced by the wind power plant 1, and/or an external reference value for voltage control, namely the voltage $V_{ref}$ to be achieved at the PCM 26, 27, 28 and, optionally, the slope of a droop function defining the mapping of the measured voltage to reactive power to be produced.

The Q controller 36 comprises a V-Q-PF controller 40 and a Q set-point dispatcher 41. The V-Q-PF controller 40 produces an internal overall reference value $Q_{ref}$ for the reactive power to be produced by the wind power plant 1, based on the inputs to the Q controller 36. "V" stands for voltage, "Q" for reactive power, and "PF" for power factor; "V-Q-PF" thereby indicates that the V-Q-PF controller 40 is enabled to receive V and/or Q and/or PF as an external reference and to produce the internal reference value $Q_{ref}$ based on this.

The Q set point dispatcher 41 splits the overall $Q_{ref}$ into individual reactive power setpoints $Q_{set}$ (30 in FIG. 3) for the local controllers 22 of the wind turbines 2.1, 2.2, 2.3 (FIG. 3), and the STATCOM controller 33, if applicable. The Q set point dispatcher also receives signals $Q_{avail}$ from the local wind-turbine controllers 22 and, if applicable, the STATCOM controller 33 indicative of the available reactive power, i.e. that amount of reactive power that could currently be produced at maximum by the individual wind turbines, and by the STATCOM, if applicable. For example, wind turbines in the first row of the wind power plant will see more wind than those at the second, third . . . rows, and may therefore operate at nominal current to produce nominal active power with only a small margin for reactive-power production left, while the latter still work at partial load and therefore have a greater current margin available for reactive power production. Signaling of $Q_{avail}$ enables the Q set point dispatcher 41 enables to split up the overall $Q_{ref}$ to be produced according to the abilities of the individual wind turbines 2 (and the STATCOM, if applicable) without having to limit the overall P production of the wind power plant 1.

As indicated at the outset, the notion of "reactive power" includes other related parameters, such as reactive current, power factor, etc. Therefore, for example, the reference value $Q_{ref}$ may also indicate an amount of reactive current to be produced by the by the wind power plant 1, and $Q_{set}$ may indicate reactive current setpoints. Thus, the wind turbines 2 and/or the STATCOM may also be commanded with reactive-current setpoints instead of reactive-power (and, optionally, active-power) setpoints.

The P controller 37 receives the signals produced by the measurement evaluator 34 which are relevant for P control, that is $f_{(feedback)}$ and/or $V_{(feedback)}$. It also receives signals $P_{avail}$ from the local wind-turbine controllers 22 indicative of the available active power, i.e. that amount of active power that could currently be produced at maximum by the individual wind turbines. In some embodiments it also receives external control inputs (24 in FIG. 3), e.g. a curtailment signal from the grid provider by which the grid provider can prescribe to what extent P production of the wind power plant 1 shall be curtailed. The curtailment prescription may be expressed in absolute terms (e.g. in MW), or in relative terms, e.g. as a percentage of the plant's nominal active power or the active power currently producible by the wind power plant 1, that is the sum of the $P_{avail}$.

The P controller 37 comprises a frequency (f) and active-power (P) controller 42 and a P set-point dispatcher 43. The f-and-P controller 42 produces an internal overall reference value $P_{ref}$ for the active power to be produced by the wind power plant 1, based on the inputs to the P controller 36 from the measurement evaluator 34, $f_{(feedback)}$ and/or $P_{(feedback)}$. For example, when the grid frequency $f_{(feedback)}$ is above a frequency threshold the f-and-P controller 42 may generate a reduced value of $P_{ref}$. If the wind power plant 1 operates in a curtailed mode the f-and-P controller 42 may also generate an increased value of $P_{ref}$ when the grid frequency $f_{(feedback)}$ is below a frequency threshold, in order to contribute to frequency control of the grid.

In embodiments with an external curtailment-functionality the external curtailment signal (24 in FIG. 3) also influences the evaluation of $P_{ref}$. For example, if the signal demands that the active power produced shall be x % of the active power currently producible by the wind power plant, $P_{ref}$ will be set to x % of the sum of all $P_{avail}$.

The P set point dispatcher 43 splits the overall $P_{ref}$ into individual active power setpoints $P_{set}$ (30 in FIG. 3) for the local controllers 22 of the wind turbines 2.1, 2.2, 2.3 (FIG.

3), using the $P_{avail}$ information. The splitting does not have to be uniform—for example, wind turbines of the first row subjected to higher load could be curtailed more than those with lower load.

The local wind-turbine controllers 22 comprise a local Q controller 44 and a local P controller 45. The STATCOM controller 33 also has a local Q controller 44, if applicable. The STATCOM is used inside the wind power plant 1 to regulate the reactive power according to the references sent by the central plant controller 21. Regarding reactive-power production, the STATCOM can be considered as another "wind turbine generator"; therefore the same control configuration will apply to it as for wind turbine generators 2.

The local Q controllers 44 receive their individual $Q_{set}$ value (31 in FIG. 3) as an input. Another input is a signal (32 in FIG. 3) indicative of the reactive power measured at the wind turbines' (or the STATCOM's) terminals 9, referred to as "$Q_{(feedback)}$" in FIG. 4. The local Q controllers 44 produce control signals for the wind turbines' (or the STATCOM's) converters 8 which cause the respective converter 8 to produce an amount of reactive power according to the individual value of $Q_{set}$.

A function of the local controllers 22 referred to as "$Q_{avail}$" determines the amount of reactive power that could be produced at maximum, e.g. by evaluating the current margin which is left for reactive power production for the converter 8 under the prevailing operation conditions. It produces the $Q_{avail}$ signal fed back to the plant controller 21.

The local P controllers 45 receive their individual $P_{set}$ value (31 in FIG. 3) as an input. Another input is a signal (32 in FIG. 3) indicative of the active power measured at the wind turbines' terminals 9, referred to as "$P_{(feedback)}$" in FIG. 4. The local P controllers 45 produce control signals for the wind turbines' converters 8 which cause the respective converter 8 to produce an amount of active power according to the individual value of $P_{set}$.

A function of the local controllers 22 referred to as "$P_{avail}$" determines the amount of reactive power that could be produced at maximum, e.g. by measuring and/or determining the currently prevailing wind speed and calculating, for example based on a power curve of the wind turbine 2, what amount of active power could be produced under the prevailing wind condition. It produces the $P_{avail}$ signal fed back to the plant controller 21.

LVRT Detection:

The LVRT logics 35 (LVRT state machine) is located inside the central plant controller 21. The measurement evaluator 34 continuously monitors the grid voltage at the PCM 26, 27, 28. If a low-voltage condition is detected by the LVRT detector 38 of measurement evaluator 34 it will send a signal to the central plant controller 21, e.g. the LVTR flag 39 "On". This acts as an interrupt. In embodiments with local control during the fault stage, upon receiving this information, the central plant controller 21 will freeze at least some of its control variables.

The LVTR flag 39 "On" is activated upon a low voltage condition; e.g. if the voltage at the PCM 26, 27, 28 is below a low-voltage threshold (e.g. the lower level of the nominal grid-operating range). The LVTR flag 39 "Off" is activated upon normal voltage condition at the PCM 26, 27, 28; e.g. when the voltage at the PCM 26, 27, 28 is above a voltage-return threshold.

Since in some embodiments the communication between the measurement device and the PPC is not synchronous, and owing to the fact that a fault can easily last for less than the sampling time of the central plant controller 21 (which may be in the order of 100 ms, for example), these LVRT "trigger" are of a special nature in some embodiments.

The LVTR flag 39 "On" signal remains activated until the LVRT state machine 35 de-activates it, for example as follows: The low-voltage condition is detected via comparing the actual voltage (e.g. calculated as a one-cycle RMS or a sliding-window average window) in each phase with the low-voltage threshold. Thereupon, the LVTR flag 39 "On" is put to "1" (=activated). All these functions may be performed by the LVRT detector 38 inside the measurement evaluator 34. At the next sample time, the LVTR flag 39 "On" signal will force the plant controller 21 to switch from normal control to control by the LVRT state machine 35; i.e. it is an LVRT_ON trigger. The LVRT state machine 35 continuously monitors the LVTR flag 39 "Off" signal, and when this signal goes high the state machine will release the LVRT_ON trigger. This could already happen at the first sample if the low voltage condition was of a short duration, or later in the process for situations with longer faults.

An exemplary implementation of the interrupt can be as follows: the LVTR flag 39 "On" signal is an LVRT_ON trigger; i.e. activates an interrupt in the plant-controller software, and a second, or static LVTR flag 39 "On" signal will be latched internally. This static signal holds the value until is reset by the LVRT state machine 35 upon activation of the LVRT_OFF trigger, being in fact the real LVRT_ON trigger signal to be considered when the LVRT state machine 35 controller is to take over the control.

Figure 5:
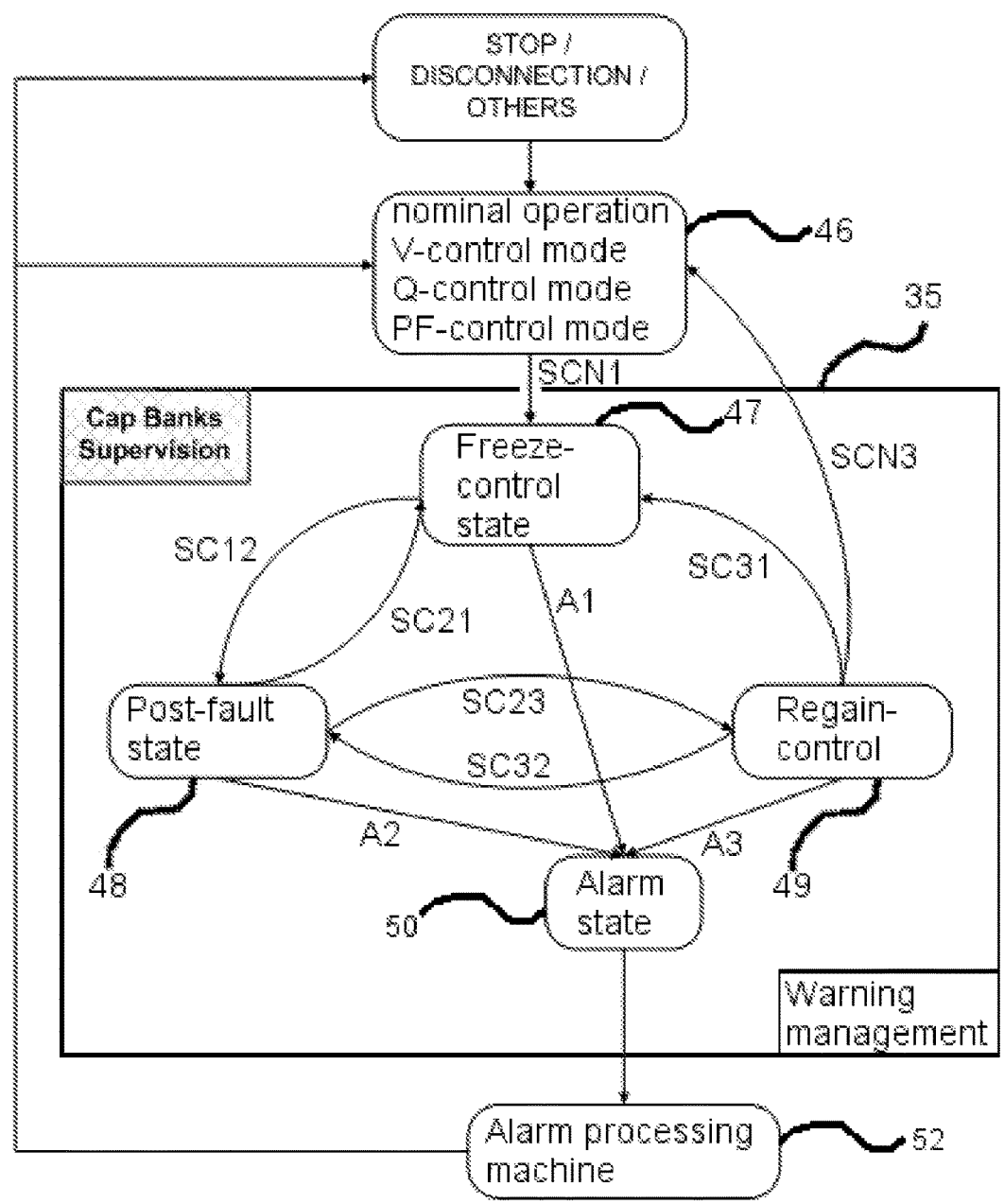
FIG. 5 is a state diagram of a first embodiment of the LVRT state machine shown in FIG. 4.
Figure 6:
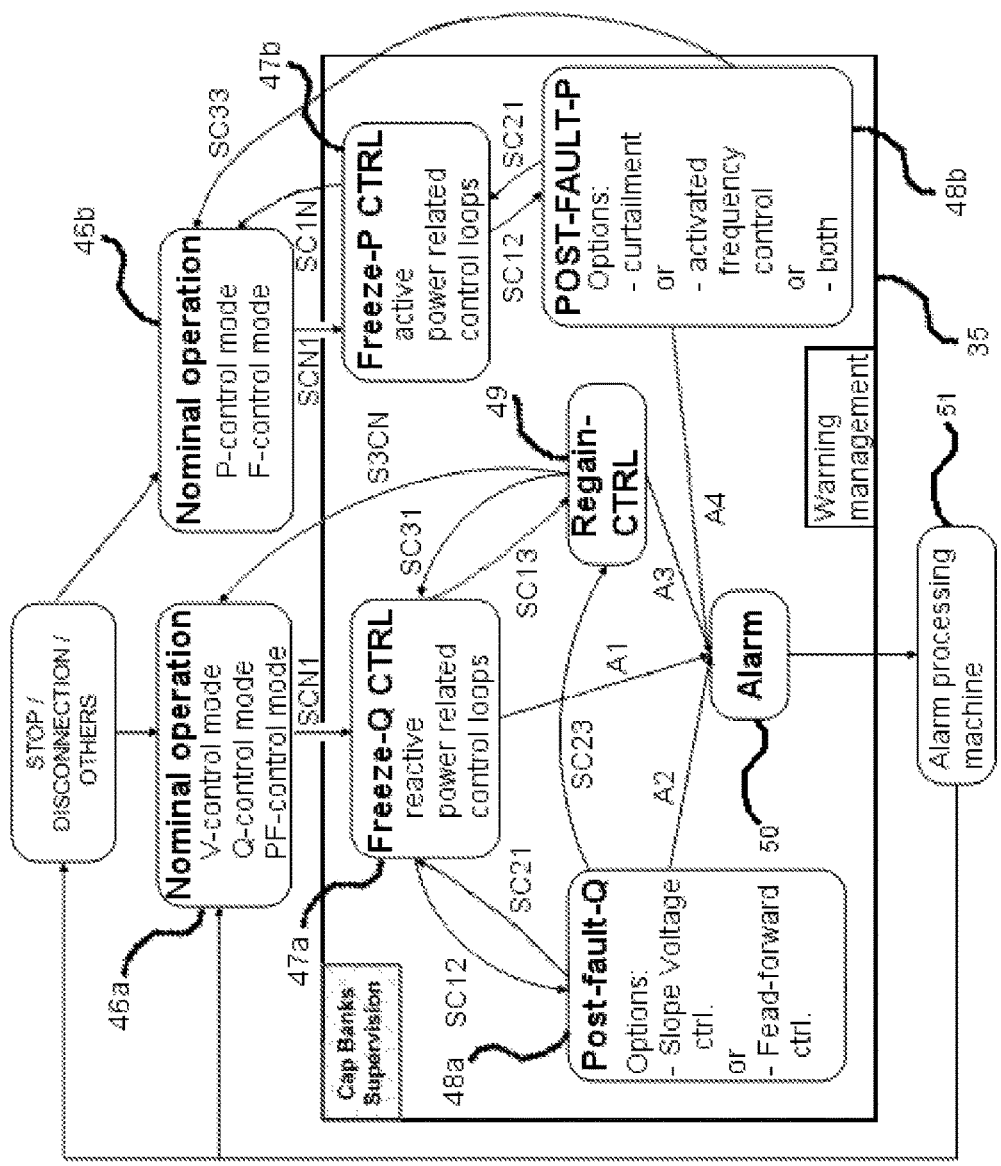
FIG. 6 is a state diagram of a second embodiment of the LVRT state machine shown in FIG. 4.

FIGS. 5 and 6: Embodiments of LVRT State Machine

FIGS. 5 and 6 illustrate different states implemented by a first embodiment and a second embodiment of the LVRT state machine 35, and transitions between these states.

The control activity in freeze-control state ("FREEZE-CTRL") and the post-fault state ("POST-FAULT") can be reactive-power-related or active-power-related. In the embodiment of FIG. 5 there is one freeze-control state ("FREEZE-CTRL") 47 and one post-fault state ("POST-FAULT") 48 including reactive-power-related and active-power-related control. In the embodiment of FIG. 6 there are reactive-power-related and active-power-related sub-states, referred to as FREEZE-Q-CTRL 47a, FREEZE-P-CTRL 47b, POST-FAULT-Q 48a, and POST-FAULT-P 48b. The sub-states FREEZE-Q-CTRL 47a and FREEZE-P-CTRL 47b together form a FREEZE-CTRL state. The sub-states POST-FAULT-Q and POST-FAULT-P together form a POST-FAULT state.

The LVRT state machine 35 is designed as an interrupt to the normal-operation software of the central-plant controller 21. When the LVRT mode is entered, the transitions shown in FIG. 5 or FIG. 6 are executed. Exit from the LVRT mode only takes place upon execution of the entire LVRT control sequence or in the case of an alarm.

FIG. 5 illustrates a first embodiment of an LVRT state machine 35 in which the mode 46 of normal operation is a V-control mode (voltage-control mode) or a Q-control mode (reactive-power-control mode) or a PF-control mode (power-factor-control mode). Upon detection of a low-voltage fault the transition takes place from the normal-operation mode 46 to the LVRT control mode in which the LVRT state machine 35 becomes active (in FIGS. 5 and 6 "35" also indicates the LVRT control mode).

The LVRT state machine 35 of FIG. 5 implements a freeze-control state 47 ("FREEZE-CTRL"), a post-fault state 48 ("POST-FAULT"), a regain-control state 49 ("REGAIN-CTRL"), and an alarm-processing state 50 ("ALARM").

Transition between these states illustrates in FIG. 5 are listed in table below:

| Name | Description |
| --- | --- |
| SCN1 | Changing from Normal control mode to LVRT control mode |
| SC12 | Changing from FREEZE-CTRL to POST-FAULT |
| SC21 | Changing from POST-FAULT to FREEZE-CTRL |
| SC23 | Changing from POST-FAULT to REGAIN-CTRL |
| SC32 | Changing from REGAIN-CTRL to POST-FAULT |
| SC31 | Changing from REGAIN-CTRL to FREEZE-CTRL |
| SC3N | Changing from REGAIN-CTRL to Normal control mode |
| A1 | Changing from FREEZE-CTRL to ALARM |
| A2 | Changing from POST-FAULT to ALARM |
| A3 | Changing from REGAIN-CTRL to ALARM |

Exemplary actions taken in the FREEZE-CTRL state 47 comprise one or more of:
  freeze all reactive power references to the WTGs and, if applicable, to the STATCOM (if any);
  freeze all active power references to the WTGs (if any);
  freeze the STATCOM capacitor bank status/reference to the actual value, if applicable;
  save and freeze the integral component in the voltage controller;
  save and freeze the integral component in the reactive power controller;
  reset allocated timing counters;
  run capacitor bank supervision (if applicable);
  run warning management.

Exemplary actions taken in the POST-FAULT state 48 comprise one or more of:
  release all reactive power references to WTGs and to the optional STATCOM (if any);
  if the voltage controller has an integral component (e.g. if it is a proportional-integral (PI) controller): release the integral component of PI voltage controller;
  release all active power references to WTGs (if any);
  run reactive-power controller with Q=0, power-factor controller with PF=1, or voltage controller with 1.0 pu or other supporting voltage reference (the previous voltage reference could differ from 1.0 pu or the supporting voltage reference);
  check return condition (e.g. check stability of grid voltage, e.g. whether grid voltage remains inside some tolerances);
  run capacitor bank supervision (if applicable);
  run warning management.

Exemplary actions taken in the REGAIN-CTRL state 49 comprise one or more of:
  release the integral component of PI reactive power controller;
  update the allocated timing counters;
  run capacitor bank supervision;
  run warning management.

Exemplary Actions taken by the ALARM state 50:
  set the alarm code, to be passed to the hierarchically superior alarm processing machine;
  prepare to exit the LVRT state machine;
  a reset action.

FIG. 6 illustrates a second embodiment of an LVRT state machine 35' in which the normal-operation mode may be either a reactive-power-related normal-operation mode 46a (V-, Q-, or PF-control mode), as in FIG. 5, or an active-power-related normal-operation mode 46b, for example a P-control mode (active-power-control mode) or an f-control mode (frequency-control mode). Upon detection of a low-voltage fault the transition takes place from the normal-operation mode 46a or 46b to the LVRT control mode in which the LVRT state machine 35 becomes active.

The LVRT state machine 35 of FIG. 6 implements a freeze-control state subdivided in reactive- and active-power-related sub-states, a freeze-Q-control state 47a ("FREEZE-QCTRL") and a freeze-P-control state 47b ("FREEZE-PCTRL"). It also implements a post-fault state subdivided in reactive- and active-power-related sub-states, a post-fault post-fault-Q state 48a ("POST-FAULT-Q") and a post-fault-P state 48b, ("POST-FAULT-P"). Finally, it has a regain-control state 49 ("REGAIN-CTRL"), and an alarm-processing state 50 ("ALARM").

Transition between these states illustrates in FIG. 6 are listed in table below:

| Name | Description |
| --- | --- |
| SCN1 | Changing from Normal control mode to FREEZE-Q/PCTRL |
| SC1N | Changing from FREEZE-PCTRL to Normal mode |
| SC12 | Changing from FREEZE-QCTRL to POST-FAULT-Q |
| SC21 | Changing from POST-FAULT-Q to FREEZE-QCTRL |
| SC23 | Changing from POST-FAULT-Q to REGAIN-QCTRL |
| SC13 | Changing from FREEZE-Q CTRL to REGAIN-CTRL |
| SC31 | Changing from REGAIN-CTRL to FREEZE-QCTRL |
| SC3N | Changing from REGAIN-CTRL to Normal control mode |
| SC33 | Changing from POST-FAULT-P to Normal control mode |
| A1 | Changing from FREEZE-Q-P CTRL to ALARM |
| A2 | Changing from POST-FAULT to ALARM |
| A3 | Changing from REGAIN-CTRL to ALARM |
| A4 | Changing from POST-FAULT to ALARM |

Exemplary actions taken in the FREEZE-Q CTRL state 47a comprise one or more of:
  freeze all reactive power references to the WTGs and to the STATCOM (if any). This is done only if no feed-forward option is selected during POST-FAULT;
  If feed-forward option is selected during POST-FAULT activate feed-forward loop now;
  freeze the STATCOM capacitor bank status/reference to the actual value, if applicable;
  freeze ramp limiters;
  save and freeze the integral component in the voltage controller;
  save and freeze the integral component in the reactive power controller;
  save and freeze the anti-windup of the reactive power controller;
  start allocated timing counters;
  run capacitor bank supervision (if applicable);
  run warning management.

Exemplary actions taken in the FREEZE-P CTRL state 47b comprise one or more of:
  freeze all active power references to the WTGs;
  freeze frequency and P loops;
  freeze ramp limiters, memory blocks;
  run warning management.

Exemplary actions taken in the POST-FAULT state 48a, 48b in FIG. 6 comprise one or more of:
  If voltage control is selected for the POST-FAULT state:
  Start counter TimeMaxPFault;
  release all reactive power references to WTGs, to the optional STATCOM (if any), and to capacitors (if any);
  if the voltage controller has an integral component, release the integral component of controllers, anti-windup and filters;
  release ramp limiters;
  release Cap (capacitor) controller;

the voltage controller is activated from this point forward independently from the previous mode of operation, while the voltage reference is to be kept constant at 1.0 pu, or another supporting voltage reference, during TimeMaxPFault. Running the voltage control with unity reference, or another supporting voltage reference, is intended to help recovering the grid after the fault;

check return condition (e.g. check stability of grid voltage, e.g. whether grid voltage remains inside some tolerances);

run capacitor bank supervision (if applicable);

run warning management.

If Feed-forward (only active power injection) control is selected for POST-FAULT period:

Start counter TimeMaxPFault.

The grid voltage level is observed to decide whether or not to leave this state. Note that the references to WTG and STATCOM were not frozen during the FREEZE-QCTRL state, and also the feed-forward loop was activated during FREEZE-QCTRL state.

run capacitor bank supervision (if applicable);

run warning management.

Exemplary actions taken in the POST-FAULT state 48a, 48b comprise one or more of:

release all reactive power references to WTGs and to the optional STATCOM (if any);

if the voltage controller has an integral component (e.g. if it is a proportional-integral (PI) controller): release the integral component of PI voltage controller;

release all active power references to WTGs (if any);

run reactive-power controller with Q=0, power-factor controller with PF=1, or voltage controller with 1.0 pu or other supporting voltage reference (the previous voltage reference could differ from 1.0 pu or the supporting voltage reference);

check return condition (e.g. check stability of grid voltage, e.g. whether grid voltage remains inside some tolerances);

run capacitor bank supervision (if applicable);

run warning management.

Exemplary actions taken in the REGAIN-CTRL state 49 comprise one or more of:

release the integral component of PI reactive power controller;

update the allocated timing counters;

run capacitor bank supervision;

run warning management.

Exemplary Actions taken by the ALARM state 50:

set the alarm code, to be passed to the hierarchically superior alarm processing machine;

prepare to exit the LVRT state machine;

a reset action.

In the embodiments of FIGS. 5 and 6, during the freeze-control state 47, 47a, 47b the wind-turbine controllers 22 (and the STATCOM controller, if applicable) take over local control until the fault is cleared, i.e. until the transition is made from the freeze-control state 47, 47a, 47b to the post-fault state 48, 48a, 48b. During this period the wind turbines 2 do not follow references provided by the central plant controller 21. They just follow their local controller 22 which calculates the amount of reactive current to be injected, according to their own local low-voltage measurement.

In alternative embodiments with central control during the fault stage the freeze-control state 47, 47a, 47b is replaced by a "fault-control state" in which the LVRT state machine 35 controls the wind-turbines 2 (and the STATCOM, if applicable) during the to ride through the fault and produce a required amount of reactive power, if any. The plant controller 21 is not frozen and calculates the references according to the voltage measured at the PCM 26, 27, 28. The local controllers 22 listens to the references provided by the central controller 21 (also) during the fault-control stage. This will cause the wind to inject the required amount of reactive current. The plant controller 21 will change its operation mode, e.g. by changing its reference values provided to the local controllers 22 for voltage control of the wind power plant 1) almost instantaneously when passing from the fault-control state to the post-fault control state 48, 48a, 48b.

The different states of the exemplary embodiments of FIGS. 5 and 6 will now be described in more detail:

FREEZE-CTRL State:

When the trigger signal for LVRT flags a low-voltage fault the normal control in the plant controller is taken over by the LVRT control module (the LVRT state machine 35) by activating the FREEZE-CTRL state 47, 47a, 47b. The state-change condition SCN1 is therefore only driven by the LVRT_ON trigger; here the trigger signal LVRT_ON Trigger. Care should therefore be taken when selecting the voltage level for triggering the FREEZE-CTRL state 47, 47a, 47b (i.e. the lower voltage threshold), since the voltage at the PCM 26, 27, 28 and at the terminals 9 of the wind turbines 2 can be different, due to the impedances 13a-13d of the internal grid 11.

FREEZE-Q CTRL State:

This section refers to the FREEZE-Q-CTRL state 47a of FIG. 6, and also applies to the FREEZE-CTRL 47 of FIG. 5, even if FREEZE-Q-CTRL is referred to.

In the FREEZE-Q CTRL state the pre-fault values for the integral components in voltage, power factor, and reactive power controllers are saved. The values saved can be the current ones; in other embodiments values of the integral components recorded at the pervious cycle step are saved. Using the values from previous sample may more precisely reflect the pre-fault values.

Along with the saving of the integral components, the current values of reactive power references are saved to enable these references to be frozen to these saved values later. The reactive power reference for the STATCOM—if present in the wind power plant at issue—is also saved.

In embodiments with local control during the FREEZE-CTRL state, while the reactive power references to all WTGs (and the reference to the STATCOM, if applicable) are frozen to the saved/pre-fault values, the WTGs are working in their local LVRT mode during the FREEZE-Q CTRL state.

The STATCOM is assumed to have the same behavior as the WTGs, and is expected to enter in autonomous operation by this time. STATCOM and WTGs could have different control times for resuming central-control operation. In this case the plant controller's resume-central-control time should be chosen as the largest one of these two control times for resuming central-control operation. Apart of different voltages levels, and since there is no a synchronous sampler action between the different controllers in the system, it may happen that in some cases the WTGs resume centrally-controlled operation before the plant controller 21 releases the frozen references. In these cases the worst scenario is that the pre-fault value of the WTG was inductive, thus having an inductive behavior of the WTG until the plant controller 21 resumes control again.

Upon entering the FREEZE-Q CTRL state 47, 47a, all related timing counters in the LVRT state machine 35 are reset to zero. The FREEZE-Q CTRL state will update its own timing counter freeze_time_Q counter and monitor its value during the FREEZE-Q CTRL state.

The LVRT state machine 35 can change from the FREEZE-Q CTRL state 47, 47a, to the POST-FAULT-Q state 48, 48a. A first condition for the LVRT state machine 35 to change from the FREEZE-CTRL-Q state to the POST-FAULT-Q state is that the LVRT_OFF trigger (signal LVRT_OFF_Trigger) has been activated (provided that no alarm was issued in meantime).

In some embodiments with local control during the fault there is a second condition, after the LVRT_OFF_Trigger has been received: The LVRT state machine 35 has a counter, WTG_WT_Q (=wind turbine generator Q wait) which is started before entering the POST-FAULT-Q state. Each wind turbine signals its ability to resume central control, i.e. to listen to references coming from the plant controller again. These signals are counted by WTG_WT_Q, and when the signal has been received from all the wind turbines of the wind power plant the transition to the POST-FAULT-Q state may be executed. This second condition aims at putting everything on hold until all WTGs have passed their own local control and are able to listen to the references coming from plant controller.

In some embodiments, a timing counter freeze_time_Q counter controls the period until the LVRT_OFF trigger appears. If the value of the timing counter freeze_time_Q counter exceeds a first time threshold without the LVRT_OFF_Trigger signal having been activated a warning will be issued. If the value gets even higher and reaches a second threshold without activation of the LVRT_OFF_Trigger signal the state is changed to the ALARM state, and the reason for this alarm condition is registered.

FREEZE-P CTRL State:

This section refers to the FREEZE-P-CTRL state 47b of FIG. 6, and also applies to the FREEZE-CTRL 47 of FIG. 5, even if FREEZE-P-CTRL is referred to.

In the FREEZE-P CTRL state the pre-fault values for the integral components in frequency and active power controllers are saved. The values saved can be the current ones; in other embodiments values of the integral components recorded at the pervious cycle step are saved. Using the values from previous sample may more precisely reflect the pre-fault values.

Along with the saving of the integral components, the current values of active power references are saved to enable these references to be frozen to these saved values later.

In embodiments with local control during the FREEZE-P CTRL state, while the active power references to all WTGs are frozen to the saved/pre-fault values, the WTGs are working in their local LVRT mode during the FREEZE-P CTRL state.

Upon entering the FREEZE-P CTRL state 47, 47b all related timing counters in the LVRT state machine 35 are reset to zero. The FREEZE-P CTRL state will update its own timing counter freeze_time_P counter and monitor its value during the FREEZE-P CTRL state.

The LVRT state machine 35 can change from the FREEZE-P CTRL state 47, 47b, to the POST-FAULT-P state 48, 48b. A first condition for the LVRT state machine 35 to change from the FREEZE-P CTRL state to the POST-FAULT-P state is that the LVRT_OFF trigger (signal LVRT_OFF_Trigger) has been activated (provided that no alarm was issued in meantime).

In some embodiments with local control during the fault there is a second condition, after the LVRT_OFF_Trigger has been received: The LVRT state machine 35 has a counter, WTG_WT_P (=wind turbine generator P wait) which is started before entering the POST-FAULT state. Each wind turbine signals its ability to resume central control, i.e. to listen to active power references coming from the plant controller again. These signals are counted by WTG_WT_P, and when the signal has been received from all the wind turbines of the wind power plant the transition to the POST-FAULT P state may be executed. This second condition aims at putting everything on hold until all WTGs have passed their own local control and are able to listen to the active power references coming from plant controller.

In some embodiments, a timing counter freeze_time_P counter controls the period until the LVRT_OFF trigger appears. If the value of the timing counter freeze_time_P counter exceeds a first time threshold without the LVRT_OFF_Trigger signal having been activated a warning will be issued. If the value gets even higher and reaches a second threshold without activation of the LVRT_OFF_Trigger signal the state is changed to the ALARM state, and the reason for this alarm condition is registered.

The FREEZE-CTRL state 47, 47a, 47b can be re-entered from the POST-FAULT state 48, 48a, 48b. If this re-entering happens too many times warnings and alarms are also triggered. To this end a counter may be incremented upon each re-entering, and is tested against the maximal allowed number of re-entering, e.g. referred to as Max_Trigger.

POST-FAULT State:

The POST-FAULT state 48, 48a, 48b, is intended to contribute to stabilization of the grid, helping the fast recovery of the whole system after the fault has been cleared. A timer, e.g. referred to as T_system timer, is activated upon entry into the POST-FAULT state.

POST-FAULT-Q State:

This section refers to the POST-FAULT-Q state 48b of FIG. 6, and also applies to the POST-FAULT state 48 of FIG. 5, even if POST-FAULT-Q is referred to.

Upon entering the POST-FAULT-Q state the freezing time for Q control loops has elapsed. The reactive power references to the WTGs and the STATCOM, if applicable, are released from freezing, and also the integral component of the voltage controller. In embodiments with voltage control during the POST-FAULT-Q state the voltage controller is activated from this point on, independently from the previous mode of operation during the previous normal operation, while the voltage reference is constant at 1.0 pu, or any other recovery-supporting voltage. Running the voltage control with unity reference or another supporting-voltage reference helps the system to recover after the fault. In other embodiments with only active-power production during the POST-FAULT-Q state a simpler controller injecting only active power is used instead of the voltage controller. In this case the Q controller will ensure that the reactive-power injected is equal to zero.

The timer T_system_timer_Q is monitored. When the timer is at the limit time, referred to as T_system_Q, the condition of the grid voltage at the PCM 26, 27, 28, is checked, for example whether or not the voltage is within a voltage range between a lower and an upper threshold around a nominal voltage value, referred to as GRID_MAX and GRID_MIN. If it is ascertained that the value is within this voltage range the POST-FAULT-Q state is changed to the REGAIN CTRL state. If this is not the case the state stays in the POST-FAULT-Q state, and a counter which counts the number of entries into the POST-FAULT-Q state (referred to as the "Counter of Entries (N)") is incremented, and T_system_timer_Q is reset and started again (because notionally staying in the POST-FAULT-Q state can be thought of leaving the POST-FAULT-Q state and entering it again).

Each time the system "enters" the POST-FAULT state the plant controller 21 will increase the Counter of Entries (N). If the value N is higher than a limit the state is changed to ALARM, and the reason for this alarm is registered.

If the LVRT_ON Trigger flags at any time during the POST-FAULT-Q state an interrupt mechanism changes the POST-FAULT-Q state back to the FREEZE-Q CTRL state.

POST-FAULT-P State:

This section refers to the POST-FAULT-P state 48c of FIG. 6, and also applies to the POST-FAULT state 48 of FIG. 5, even if POST-FAULT-P is referred to.

Upon entering the POST-FAULT-P state the freezing time for P/f control loops has elapsed. The active power references to the WTGs are released from freezing, and also the integral component of the P/f controller. In embodiments with active control during the POST-FAULT-P state either the curtailment is activated from this point on, independently from the previous mode of operation during the previous normal operation, either the frequency controller is activated, either a damping oscillation system or all of them. Running curtailment, frequency or damping control can help the system to recover the system after the fault under some scenarios, such as frequency contingencies or load flow bottlenecks due to loss of transmission lines, or oscillatory phenomena due to some resonances between grid areas which can be activated after severe transients.

The timer T_system_timer_P is monitored. When the timer is at the limit time, referred to as T_system_P, the condition of the grid voltage at the PCM 26, 27, 28, is checked, for example whether or not the frequency is within a frequency range between a lower and an upper threshold around a nominal frequency value. If it is ascertained that the value is within this frequency range the POST-FAULT-P state is changed to the REGAIN CTRL state. If this is not the case the state stays in the POST-FAULT-P state, and a counter which counts the number of entries into the POST-FAULT-P state (referred to as the "Counter of Entries (N)") is incremented, and T_system_timer_P is reset and started again (because notionally staying in the POST-FAULT-P state can be thought of leaving the POST-FAULT-P state and entering it again).

Each time the system "enters" the POST-FAULT state the plant controller 21 will increase the Counter of Entries (N). If the value N is higher than a limit the state is changed to ALARM, and the reason for this alarm is registered.

If the LVRT_ON Trigger flags at any time during the POST-FAULT-P state an interrupt mechanism changes the POST-FAULT-P state back to the FREEZE-CTRL-P state.

REGAIN-CTRL State:

The REGAIN-CTRL state 49 is an optional intermediate state between the LVRT control mode, in which the LVRT state machine 35 is active, and the normal-operation mode 46. In this state preparatory action is executed for leaving the LVRT state machine 35 and resuming normal operation.

Nominal grid operation is resumed towards the end of the REGAIN-CTRL state 49 (for P and Q independently, in the embodiment of FIG. 6). Reference values relating to reactive-power set-points provided by the plant controller 21, such as no-reactive-power production or neutral or supporting voltage control, are therefore now changed towards reference values corresponding to normal operation. Reference values relating to active-power set-points provided by the plant controller 21, such as curtailment production or frequency control, are now changed towards reference values corresponding to normal operation. A locking mechanism activated to lock the normal-operation references during the FREEZE-CTRL and POST-FAULT stages are now unlocked, and the normal-operation reference values are re-established.

The transition from the references effective at the beginning of the REGAIN-CTRL state (corresponding to those from the end of the previous POST-FAULT state) to those effective at the at the end of the REGAIN-CTRL state (corresponding to those at the beginning of the normal-operation mode 46) is performed in a soft (i.e. continuous) manner, to avoid any "jumps" and over-shooting.

ALARM State:

During the operation of the plant controller 21, and the LVRT state machine in particular, some signals are supervised, if they are outside boundaries a change of the current status to the ALARM state 50 is initiated. In the ALARM state 50 the alarm may be coded and communicated to an alarm management system, referred to as alarm processing machine 51, of the plant controller 21. Based on this alarm-related information the alarm processing machine 51 what measure is to be taken, e.g. that the whole plant controller 21 has to be stopped, or that it can be re-started after a complete reset of its sub-controllers.

Figure 7:
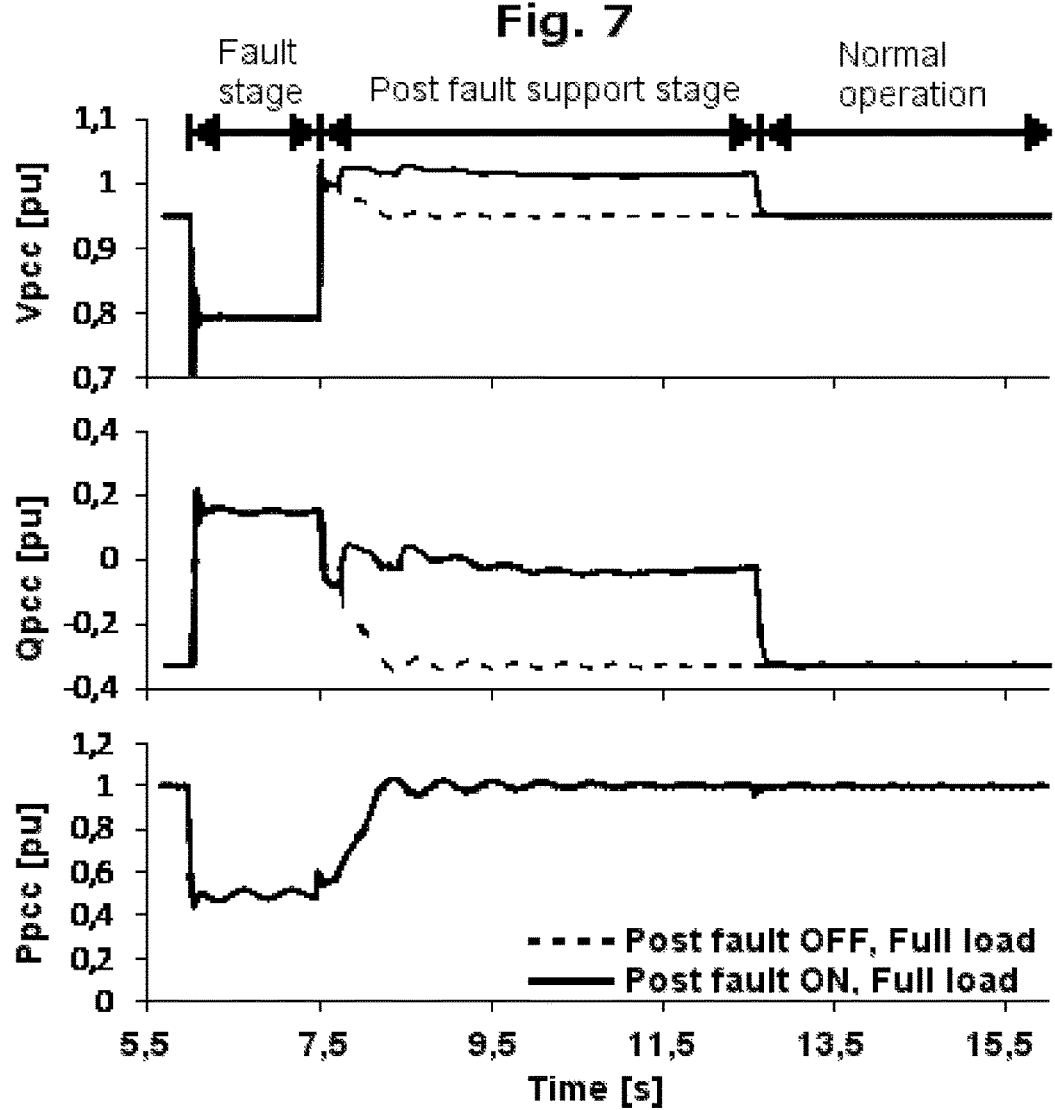
FIG. 7 shows exemplary diagrams of voltage, reactive power, and active power as a function of time with and without post-fault support.

FIG. 7: Example of Operation

FIG. 7 shows exemplary diagrams of voltage $V_{PCC}$ at the PCC/PCM 26, and the reactive power $Q_{PCC}$ and the active power $P_{PCC}$ produced by a wind power plant 1 at the PCC/PCM 26 with (solid lines) and without (dashed line) post-fault support, as a function of time.

In the example shown, the WTGs of the power plant are DFIG-based WTGs (DFIG=double-fed induction generator). The external grid 14 has a short circuit ratio (SCR)=5. The plant control operates in a power factor (PF) control mode before the fault, with PF of about 0.95 inductive, and an active-power production of 1 pu. The post-fault support is done with zero reactive-power injection at the PCC (only active-power injection at the PCC).

As can be seen in FIG. 7, when the post-fault support is activated the plant controller controls the reactive power independently of the pre-fault control mode setting. The reactive power at the PCC is controlled during the post-fault support stage in such a way that its value is close to zero. After this period the control returns to the previous operation mode. The length of the post-fault support stage time can be set to a value which matches specific requirements for grid recovery in advance, or may depend on a measured grid-stability parameter. Grid-voltage stability can particularly be improved by applying such post-fault support at the plant level in wind power plants controlled in PF or Q mode and connected to grids with low SCR, since just after the fault the post fault state can drive the voltage at PCC close to 1 pu, depending on the post-fault mode chosen, which may differ from the control mode selected during normal operation.

FIG. 7 also shows analogous diagrams for $V_{PCC}$, $Q_{PCC}$, and $P_{PCC}$ obtained without post-fault support. While in the example shown there is no significant difference to the diagrams with post-fault support in $P_{PCC}$, $V_{PCC}$ and $Q_{PCC}$ rapidly approach the pre-fault values if there is no post-fault support.

Figure 8:
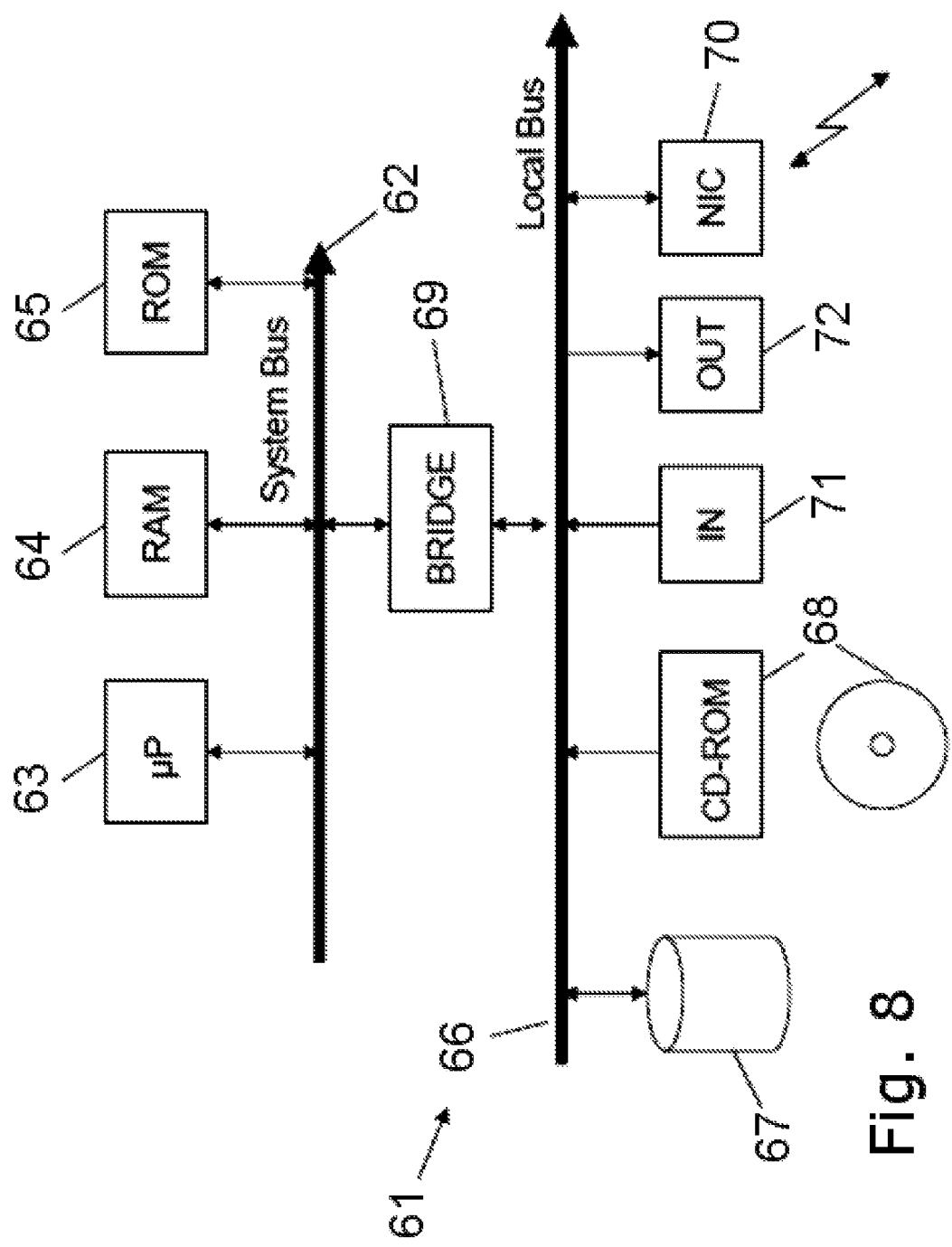
FIG. 8 shows an exemplary implementation of the hardware of a central plant controller and a local wind-turbine controller.

FIG. 8: Implementation of Plant Controller

FIG. 8 shows an exemplary implementation of the hardware of the plant controller 21. According to FIG. 8, the plant controller 21 is a computer 61 formed by several units that are connected in parallel to a system bus 62. One or more microprocessors 63 control operation of the computer 61; a random-access memory (RAM) 64 is directly used as a working memory for program code and data by the microprocessor(s) 63, and a read-only memory (ROM) 65 stores basic code for a bootstrap of the computer 61 in a non-volatile manner.

Peripheral units are connected to a local bus 66 by means of respective interfaces. For example, a magnetic memory in the form of a hard-disk with drive 67 and/or an optical memory, e.g a CD-ROM with drive 68 stores programs in a non-volatile manner which implement the control functionalities described herein, including the LVRT state machine 35, and cause the methods described herein to be carried out when executed by the computer 61. A bridge unit 69 interfaces the system bus 62 with the local bus 66. In other embodiments there is only one common bus providing the functionalities of the system bus and the local bus.

The computer 61 also includes network interfaces (NIC) 71 to connect the computer 51 to the measurement device 34 to receive measurement values, such as $Q_{(feedback)}$, $V_{(feedback)}$, $f_{(feedback)}$ and/or $P_{(feedback)}$, and the LVRT flag 39, to the control network 23 (FIG. 3) to communicate with the local wind-turbine controllers 22, and to an external network to communicate with the grid provider, remote plant supervision, etc. The computer 61 may also be equipped with input devices 72 (for example, a keyboard and a mouse), and output devices 73 (for example, a monitor). These interfaces 71, 72, 73 may be connected to the local bus 66.

The hardware of the local wind-turbine controllers 22 can be implemented in a corresponding manner as the plant-controller hardware of FIG. 8.

All publications mentioned in this specification are herein incorporated by reference.

Although certain products and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A wind power plant capable of supporting a recovery of an electric grid after a low-voltage grid fault occurring when a grid voltage of the electrical grid is less than a predefined normal grid operation range, the wind power plant comprising:
   a plurality of wind turbines configured to remain connected with the electrical grid during a fault stage occurring when the low-voltage grid fault is detected; and
   a central plant controller configured to:
      control, prior to detecting the low-voltage grid fault and within a predefined nominal-grid operation mode in which the grid voltage is within the predefined nominal grid operation range, operation of the plurality of wind turbines by communicating reference values for at least one electric-production parameter,
      control, during a post-fault support stage occurring after the low-voltage grid fault has been cleared, operation of the plurality of wind turbines to provide only active power to the electric grid, or to perform voltage control of the wind power plant, thereby supporting the recovery of the electric grid, and
      return to the nominal-grid operation mode in a nominal-grid operation stage occurring after the post-fault support stage.

2. The wind power plant of claim 1, wherein each wind turbine of the plurality of wind turbines comprises a respective local wind turbine controller configured to:
   during the fault stage, autonomously control the electric output of the wind turbine to thereby ride through the low-voltage grid fault.

3. The wind power plant of claim 1, wherein the central plant controller is further configured to control operation of the plurality of wind turbines during the fault stage to thereby ride through the low-voltage grid fault.

4. The wind power plant of claim 1, wherein the central plant controller is configured to perform, during the post-fault support stage, at least one of curtailment operation, grid-frequency support, and damping grid oscillations control.

5. The wind power plant of claim 1, wherein the reference values for at least one electric-production parameter communicated in the predefined nominal-grid operation mode comprise reference values for at least one of reactive power production, active power production, a power factor of the power produced, for a phase angle between grid voltage and current produced, current reactive current production relative to a nominal current of the wind turbine, a voltage to be achieved at terminals of the wind turbine, active power production relative to a nominal power of the wind turbine, and active power production relative to available active power at current wind conditions.

6. The wind power plant of claim 1, wherein the plurality of wind turbines is configured to, during at least a portion of the fault stage, produce reactive current to support recovery of the electric grid.

7. The wind power plant of claim 1, wherein performing voltage control of the wind power plant in the post-fault support stage comprises:
   measuring a voltage at a common point of measurement, comparing the measured voltage with a reference voltage, and
   adjusting a reference value for power reactive power or reactive current production to counteract a difference between the measured voltage and the reference voltage.

8. The wind power plant of claim 1, wherein, the wind power plant is configured to produce reactive power through one or more of converters of the plurality of wind turbines and one or more static synchronous compensators (STAT-COMs) within the wind power plant.

9. The wind power plant of claim 1, wherein the central plant controller is configured to return to the nominal-grid operation mode upon expiration of a predetermined time interval or a fault severity-dependent time interval after entering the post-fault support stage.

10. The wind power plant of claim 1, wherein the central plant controller is further configured to monitor at least one grid parameter of the electric grid within the post-fault support stage, and to return to the nominal-grid operation mode upon determining that a value of the at least one grid parameter indicates nominal-grid conditions.

11. The wind power plant of claim 2, wherein the central plant controller is further configured to:
   upon detecting the low-voltage grid fault:
      freeze a state of at least a portion of the central plant controller providing electric production control in the nominal-grid operation mode, and
      store a pre-fault operation value of at least one control variable; and
   upon returning to the nominal-grid operation mode, resume control using the pre-fault operation value.

12. The wind power plant of claim 1, wherein the central plant controller comprises a low-voltage ride through state machine comprising a plurality of predefined control states, the plurality of predefined control states comprising:
- a fault state active during the fault stage;
- a post-fault state active during the post-fault support stage;
- a normal-operation state or a regain-control state that is active during transition from the post-fault support stage to the nominal-grid operation stage.

13. A method of controlling an electric output of a wind power plant connected to an electric grid having a grid voltage, the wind power plant comprising a plurality of wind turbines and a central plant controller,
wherein the central plant controller operates the plurality of wind turbines in a nominal-grid operation mode when the grid voltage is within a predefined nominal grid operation range, wherein operating the plurality of wind turbines comprises communicating reference values for at least one electric-production parameter,
the method comprising:
- entering a fault stage in response to detecting a low-voltage grid fault, during which the grid voltage falls below the nominal grid operation range, wherein the plurality of wind turbines are configured to ride through the low-voltage grid fault;
- entering a post-fault support stage after the low-voltage grid fault has been cleared;
- controlling, within the post-fault support stage and using the central plant controller, the plurality of wind turbines to:
  (i) provide only active power to the electric grid, or
  (ii) perform voltage control of the wind power plant; and
- entering, after the post-fault support stage, a nominal-grid operation stage in which the nominal-grid operation mode is resumed.

14. The method of claim 13, wherein the plurality of wind turbines comprises a plurality of local wind turbine controllers, and
wherein entering the fault stage in response to detecting a low-voltage grid fault comprises transferring control of the plurality of wind turbines from the central plant controller to the local wind turbine controllers.

15. The method of claim 13, further comprising:
producing, during a least a portion of the fault stage, reactive current using the plurality of wind turbines to support recovery of the electric grid.

16. The method of claim 13, wherein entering a nominal-grid operation stage occurs upon expiration of a predetermined time interval or a fault severity-dependent time interval after entering the post-fault support stage.

17. The method of claim 13, further comprising:
monitoring, during the post-fault support stage and using the central plant controller, at least one grid parameter of the electric grid,
wherein entering a nominal-grid operation stage occurs upon determining that a value of the at least one grid parameter indicates nominal-grid conditions.

18. The method of claim 13, further comprising:
in response to detecting the low-voltage grid fault:
- freeze a state of at least a portion of the central plant controller providing electric production control in the nominal-grid operation mode, and
- store a pre-fault operation value of at least one control variable; and
upon resuming the nominal-grid operation mode, resume control using the pre-fault operation value.

19. A computer program product comprising a non-transitory computer-readable storage medium containing code which, when executed by one or more processors, performs an operation for controlling an electric output of a wind power plant connected to an electric grid having a grid voltage, the wind power plant comprising a plurality of wind turbines, the operation comprising:
- communicating, within a predefined nominal-grid operation mode in which the grid voltage is within a predefined nominal grid operation range, reference values for at least one electric-production parameter to thereby control operation of the plurality of wind turbines;
- entering a fault stage in response to detecting a low-voltage grid fault, during which the grid voltage falls below the nominal grid operation range, wherein the plurality of wind turbines are configured to ride through the low-voltage grid fault;
- entering a post-fault support stage after the low-voltage grid fault has been cleared;
- controlling, within the post-fault support stage, the plurality of wind turbines to:
  (i) provide only active power to the electric grid, or
  (ii) perform voltage control of the wind power plant; and
- entering, after the post-fault support stage, a nominal-grid operation stage in which the nominal-grid operation mode is resumed.

20. The computer program product of claim 19, wherein the plurality of wind turbines comprises a plurality of local wind turbine controllers, and
wherein entering the fault stage in response to detecting a low-voltage grid fault comprises transferring control of the plurality of wind turbines from the central plant controller to the local wind turbine controllers.

* * * * *